US012522442B2

(12) United States Patent
Chellappan et al.

(10) Patent No.: US 12,522,442 B2
(45) Date of Patent: Jan. 13, 2026

(54) THIN STRIP CLASSIFICATION

(71) Applicant: Sortera Technologies Inc., Markle, IN (US)

(72) Inventors: Lakshmi Chellappan, Markle, IN (US); Manuel Gerardo Garcia, Jr., Austin, TX (US); Hoang Triet Giang Le, Fort Wayne, IN (US); Casey Hughlett, Fort Wayne, IN (US)

(73) Assignee: SORTERA TECHNOLOGIES, INC., Markle, IN (US)

( * ) Notice: Subject to any disclaimer, the term of this patent is extended or adjusted under 35 U.S.C. 154(b) by 257 days.

(21) Appl. No.: 18/491,683

(22) Filed: Oct. 20, 2023

(65) Prior Publication Data

US 2024/0132297 A1  Apr. 25, 2024
US 2024/0228180 A9  Jul. 11, 2024

Related U.S. Application Data

(60) Provisional application No. 63/478,823, filed on Jan. 6, 2023, provisional application No. 63/418,242, filed on Oct. 21, 2022.

(51) Int. Cl.
*G06V 10/20* (2022.01)
*B07C 5/342* (2006.01)
(Continued)

(52) U.S. Cl.
CPC .............. *B65G 43/08* (2013.01); *B07C 5/342* (2013.01); *B07C 5/346* (2013.01); *G01N 23/223* (2013.01);
(Continued)

(58) Field of Classification Search
CPC .............. B65G 43/08; B65G 2203/044; B65G 2811/0673; B07C 5/342; B07C 5/346;
(Continued)

(56) References Cited

U.S. PATENT DOCUMENTS

| 4,317,521 | A | 3/1982 | Clark |
| 4,572,735 | A | 2/1986 | Poetzschke |

(Continued)

FOREIGN PATENT DOCUMENTS

| BR | PI0210794-5 B1 | 7/2002 |
| CN | 102861722 | 1/2013 |

(Continued)

OTHER PUBLICATIONS

United States International Searching Authority; International Search Report & Written Opinion for PCT/US2023/077487; Feb. 14, 2024; 7 pages.

(Continued)

*Primary Examiner* — Kiho Kim
(74) *Attorney, Agent, or Firm* — Kelly Kordzik

(57) ABSTRACT

A sorting system conveys a heterogeneous mixture of material pieces past an XRF system and a vision system. A classification of a material piece is changed to a high copper content aluminum alloy when the XRF system classifies the material piece as a low copper content aluminum alloy and the vision system determines that the material piece is a thin strip material piece. The reclassified material piece is then sorted accordingly.

19 Claims, 16 Drawing Sheets

(51) Int. Cl.
 *B07C 5/346* (2006.01)
 *B65G 43/08* (2006.01)
 *G01N 23/223* (2006.01)
 *G06V 10/764* (2022.01)

(52) U.S. Cl.
 CPC .......... *G06V 10/255* (2022.01); *G06V 10/764* (2022.01); *B65G 2203/044* (2013.01); *B65G 2811/0673* (2013.01); *G01N 2223/643* (2013.01)

(58) Field of Classification Search
 CPC ........... G01N 23/223; G01N 2223/643; G06V 10/255; G06V 10/764
 See application file for complete search history.

(56) References Cited

U.S. PATENT DOCUMENTS

| | | | |
|---|---|---|---|
| 4,586,613 A | 5/1986 | Horii | |
| 4,834,870 A | 5/1989 | Osterberg | |
| 4,848,590 A | 7/1989 | Kelly | |
| 5,016,039 A | 5/1991 | Sosa | |
| 5,042,947 A | 8/1991 | Potzschke | |
| 5,114,230 A | 5/1992 | Pryor | |
| 5,236,092 A | 8/1993 | Krotkov | |
| 5,260,576 A | 11/1993 | Sommer, Jr. | |
| 5,663,997 A | 9/1997 | Willis | |
| 5,676,256 A | 10/1997 | Kumar | |
| 5,733,592 A | 3/1998 | Wettstein | |
| 5,738,224 A | 4/1998 | Sommer, Jr. | |
| 5,911,327 A | 6/1999 | Tanaka | |
| 6,064,476 A | 5/2000 | Goltsos | |
| 6,100,487 A | 8/2000 | Schultz | |
| 6,124,560 A | 9/2000 | Roos | |
| 6,266,390 B1 * | 7/2001 | Sommer, Jr. | G01N 23/223 378/45 |
| 6,313,422 B1 | 11/2001 | Anibas | |
| 6,313,423 B1 | 11/2001 | Sommer | |
| 6,412,642 B2 | 7/2002 | Charles | |
| 6,519,315 B2 | 2/2003 | Sommer, Jr. | |
| 6,545,240 B2 | 4/2003 | Kumar | |
| 6,795,179 B2 | 9/2004 | Kumar | |
| 7,099,433 B2 | 8/2006 | Sommer et al. | |
| 7,200,200 B2 | 4/2007 | Laurila | |
| 7,564,943 B2 | 7/2009 | Sommer, Jr. | |
| 7,616,733 B2 | 11/2009 | Sommer | |
| 7,674,994 B1 | 3/2010 | Valerio | |
| 7,763,820 B1 | 7/2010 | Sommer, Jr. et al. | |
| 7,802,685 B2 | 9/2010 | Allen | |
| 7,848,484 B2 | 12/2010 | Sommer, Jr. et al. | |
| 7,886,915 B2 | 2/2011 | Shulman | |
| 7,978,814 B2 | 7/2011 | Sommer et al. | |
| 8,144,831 B2 | 3/2012 | Sommer, Jr. | |
| 8,553,838 B2 | 10/2013 | Sommer | |
| 8,600,545 B2 | 12/2013 | Earlam | |
| 8,615,123 B2 | 12/2013 | Dabic | |
| 8,855,809 B2 | 10/2014 | Spencer et al. | |
| 9,156,162 B2 | 10/2015 | Suzuki | |
| 9,316,596 B2 | 4/2016 | Levesque | |
| 9,514,590 B2 | 12/2016 | Lindbichler | |
| 9,785,851 B1 | 10/2017 | Torek | |
| 9,927,354 B1 | 3/2018 | Starr | |
| 9,956,609 B1 | 5/2018 | De Saro | |
| 10,005,107 B2 | 6/2018 | Ogusu | |
| 10,295,451 B2 | 5/2019 | Schneider | |
| 10,467,477 B2 | 11/2019 | Gershtein | |
| 10,478,861 B2 | 11/2019 | Comtois | |
| 10,722,922 B2 | 7/2020 | Kumar | |
| 10,799,915 B2 | 10/2020 | Horowitz | |
| 10,824,936 B2 | 11/2020 | Wu | |
| 10,967,404 B2 | 4/2021 | Grof | |
| 11,278,937 B2 | 3/2022 | Kumar | |
| 2002/0186882 A1 | 12/2002 | Cotman | |
| 2003/0147494 A1 | 8/2003 | Sommer, Jr. | |
| 2004/0151364 A1 | 8/2004 | Kenneway | |
| 2004/0235970 A1 | 11/2004 | Smith | |
| 2006/0239401 A1 | 10/2006 | Sommer, Jr. | |
| 2007/0029232 A1 | 2/2007 | Cowling | |
| 2007/0262000 A1 | 11/2007 | Valerio | |
| 2008/0029445 A1 | 2/2008 | Russcher | |
| 2008/0257795 A1 | 10/2008 | Shuttleworth | |
| 2008/0302707 A1 | 12/2008 | Bourely | |
| 2009/0236268 A1 | 9/2009 | Shulman | |
| 2009/0292422 A1 | 11/2009 | Eiswerth | |
| 2010/0017020 A1 | 1/2010 | Hubbard-Nelson | |
| 2010/0264070 A1 | 10/2010 | Sommer, Jr. | |
| 2011/0017644 A1 | 1/2011 | Valerio | |
| 2011/0247730 A1 | 10/2011 | Yanar | |
| 2012/0148018 A1 | 6/2012 | Sommer, Jr. | |
| 2013/0028487 A1 | 1/2013 | Stager | |
| 2013/0079918 A1 | 3/2013 | Spencer | |
| 2013/0126399 A1 | 5/2013 | Wolff | |
| 2013/0264249 A1 | 10/2013 | Sommer, Jr. | |
| 2013/0304254 A1 | 11/2013 | Torek | |
| 2015/0336135 A1 | 11/2015 | Corak | |
| 2016/0051217 A1 | 2/2016 | Douglas | |
| 2016/0059450 A1 | 3/2016 | Meredith | |
| 2016/0250665 A1 | 9/2016 | Lampe | |
| 2016/0346811 A1 | 12/2016 | Iino | |
| 2017/0014868 A1 | 1/2017 | Garcia, Jr. et al. | |
| 2017/0232479 A1 | 8/2017 | Pietzka | |
| 2017/0261437 A1 | 9/2017 | Buchter | |
| 2018/0065155 A1 | 3/2018 | Ripley | |
| 2018/0154475 A1 | 6/2018 | Fagan | |
| 2018/0243800 A1 | 8/2018 | Kumar et al. | |
| 2019/0091729 A1 | 3/2019 | Gillner | |
| 2019/0130560 A1 | 5/2019 | Horowitz | |
| 2019/0210067 A1 | 7/2019 | Kumar et al. | |
| 2019/0247891 A1 | 8/2019 | Kumar et al. | |
| 2019/0257773 A1 | 8/2019 | Murray | |
| 2019/0299255 A1 | 10/2019 | Chaganti | |
| 2020/0050922 A1 | 2/2020 | Wu | |
| 2020/0261952 A1 | 8/2020 | Murata | |
| 2020/0290088 A1 | 9/2020 | Kumar | |
| 2020/0361659 A1 | 11/2020 | Whitman | |
| 2020/0368786 A1 | 11/2020 | Kumar et al. | |
| 2021/0001377 A1 | 1/2021 | Sutton | |
| 2021/0094075 A1 | 4/2021 | Horowitz | |
| 2021/0217156 A1 | 7/2021 | Balachandran | |
| 2021/0229133 A1 | 7/2021 | Kumar et al. | |
| 2021/0346916 A1 | 11/2021 | Kumar et al. | |
| 2022/0016675 A1 | 1/2022 | Kumar | |
| 2022/0023918 A1 | 1/2022 | Kumar et al. | |
| 2022/0161298 A1 | 5/2022 | Kumar | |
| 2022/0168781 A1 | 6/2022 | Kumar | |
| 2022/0203407 A1 | 6/2022 | Kumar et al. | |
| 2022/0245402 A1 | 8/2022 | Tae | |
| 2022/0355342 A1 | 11/2022 | Kumar et al. | |
| 2022/0371057 A1 | 11/2022 | Kumar | |
| 2023/0011383 A1 | 1/2023 | Balthasar | |
| 2023/0044783 A1 | 2/2023 | Sortera | |
| 2023/0053268 A1 | 2/2023 | Sortera | |
| 2023/0169751 A1 | 6/2023 | Geurts | |
| 2023/0173543 A1 | 6/2023 | Sortera | |
| 2023/0176028 A1 | 6/2023 | Kumar et al. | |
| 2024/0109103 A1 | 4/2024 | Kumar et al. | |
| 2024/0116084 A1 | 4/2024 | Gagliardi | |
| 2024/0149304 A1 | 5/2024 | Sortera | |
| 2024/0228180 A9 | 7/2024 | Sortera | |
| 2024/0228181 A9 | 7/2024 | Sortera | |

FOREIGN PATENT DOCUMENTS

| | | |
|---|---|---|
| CN | 106000904 | 10/2016 |
| CN | 111659635 | 9/2020 |
| CN | 211888005 U | 11/2020 |
| DE | 202009006383 | 9/2009 |
| EP | 0074447 | 1/1987 |
| JP | H07-275802 | 10/1995 |
| JP | 2010-172799 | 8/2010 |
| JP | 5969685 | 7/2016 |
| JP | 2017-109197 | 6/2017 |
| JP | 2021163078 | 10/2021 |
| TW | I707812 | 10/2020 |

(56) References Cited

FOREIGN PATENT DOCUMENTS

| WO | WO-0122072 A1 * | 3/2001 | ............ B07C 5/346 |
|---|---|---|---|
| WO | WO2011/159269 | 12/2011 | |
| WO | WO2012/089185 | 7/2012 | |
| WO | WO2016/199074 | 12/2016 | |
| WO | WO2018/091617 | 5/2018 | |
| WO | WO2022/172238 | 8/2022 | |
| WO | WO2023/137423 | 7/2023 | |

OTHER PUBLICATIONS

European Patent Office; Extended European Search Report for application EP19792330.3; Apr. 30, 2021; 7 pages.
India Patent Office; Office Action issued for India Application Serial No. 201937044046; Jun. 4, 2020; 7 pages.
United States International Searching Authority; International Search Report & Written Opinion for PCT/US2016/042850; Sep. 28, 2016; 15 pages.
A. Lee, "Comparing Deep Neural Networks and Traditional Vision Algorithms in Mobile Robotics," Swarthmore College, 9 pages, downloaded from Internet on May 1, 2018.
K. Tarbell et al., "Applying Machine Learning to the Sorting of Recyclable Containers," University of Illinois at Urbana-Champaign, Urbana, Illinois, 7 pages, downloaded from Internet on May 1, 2018.
The United States Patent and Trademark Office, Non-Final Office Action, U.S. Appl. No. 15/213,129, filed Oct. 6, 2017.
International Searching Authority, International Search Report and the Written Opinion, International Application No. PCT/US2018/029640, Jul. 23, 2018; 23 pages.
European Patent Office; Extended Search Report for application 16825313.6; Jan. 28, 2019; 12 pages.
India Patent Office; Office Action issued for India Application Serial No. 201817002365; Mar. 12, 2020; 6 pages.
International Searching Authority, International Search Report and the Written Opinion, International Application No. PCT/US2019/022995, Jun. 5, 2019; 10 pages.
The United States Patent and Trademark Office, Non-Final Office Action, U.S. Appl. No. 16/375,675, filed Jun. 28, 2019.
The United States Patent and Trademark Office, Final Office Action, U.S. Appl. No. 16/375,675, filed Jan. 17, 2020.
Chinese Patent Office; Office Action issued for Chinese Application No. 201980043725.X on Apr. 28, 2022; 21 pages; Beijing, CN.
Zhou et al., "SSA-CNN: Semantic Self-Attention CNN for Pedestrian Detection," ArXiv: 1902.09080v3, Jun. 6, 2019, pp. 4321-4330.
Zhang et al., "Designing and verifying a disassembly line approach to cope with the upsurge of end-of-life vehicles in China," Elsevier, Waste Management (2018), vol. 76, Jun. 2018, pp. 697-707. Retrieved on Jul. 10, 2022 from <https://isiarticles.com/budles/Article/pre/pdf/98926.pdf>.
Japan Patent Office; Office Action issued Jan. 10, 2023 for Serial No. 2021-509947; 9 pages (with translation).
International Searching Authority, International Search Report and the Written Opinion of the International Searching Authority, International Application No. PCT/US2022/035011, Oct. 27, 2022.
Rozenstein, O. et al, "Development of a new approach based on midwave infrared spectroscopy for post-consumer black plastic waste sorting in the recycling industry," Waste Management 68 (2017); pp. 38-44, Jul. 2017.
United States International Searching Authority; International Search Report & Written Opinion for PCT/US2022/020657; Jun. 16, 2022; 10 pages.
United States International Searching Authority; International Search Report & Written Opinion for PCT/US2022/016869; Jun. 29, 2022; 11 pages.
United States International Searching Authority; International Search Report & Written Opinion for PCT/US2022/060626; May 2, 2023; 12 pages.
United States International Searching Authority; International Search Report & Written Opinion for PCT/US2022/051681; Mar. 20, 2023; 6 pages.
United States International Searching Authority; International Search Report & Written Opinion for PCT/US2022/039622; Oct. 28, 2022; 12 pages.
United States International Searching Authority; International Search Report & Written Opinion for PCT/US2022/035013; Sep. 23, 2022; 7 pages.
Mach Vision New High Technology Equipment—Machinex, Jun. 8, 2021, downloaded from https://www.machinexrecycling.com/news/mach-vision-new-high-technology-equipment/, 1 page.
BHS and NRT Introduce Max-AI™; Bulk Handling Systems (BHS); Apr. 18, 2017; downloaded from https://max-ai.com/autonomous-qc/ on Apr. 18, 2024.
Gao et al., "Applying Improved Optical Recognition with Machine Learning on Sorting Cu Impurities in Steel Scrap," Journal of Sustainable Metallurgy, vol. 6, pp. 785-795, Dec. 7, 2020.
United States International Searching Authority; International Search Report & Written Opinion for PCT/US2022/030943; Sep. 28, 2022; 10 pages; Alexandria, VA.
The United States Patent and Trademark Office, Non-Final Office Action, U.S. Appl. No. 16/358,374, filed Jun. 28, 2019.
The United States Patent and Trademark Office, Non-Final Office Action, U.S. Appl. No. 16/358,374, filed Dec. 12, 2019.
The United States Patent and Trademark Office, Non-Final Office Action, U.S. Appl. No. 15/963,755, filed Apr. 5, 2019.
The United States Patent and Trademark Office, Non-Final Office Action, U.S. Appl. No. 15/963,755, filed Sep. 13, 2019.
The United States Patent and Trademark Office, Non-Final Office Action, U.S. Appl. No. 15/963,755, filed May 11, 2020.
The United States Patent and Trademark Office, Non-Final Office Action, U.S. Appl. No. 17/491,415, filed Nov. 15, 2021.
The United States Patent and Trademark Office, Non-Final Office Action, U.S. Appl. No. 17/673,694, filed Jan. 25, 2024.
The United States Patent and Trademark Office, Non-Final Office Action, U.S. Appl. No. 17/696,831, filed Mar. 29, 2024.
The United States Patent and Trademark Office, Non-Final Office Action, U.S. Appl. No. 17/495,291, filed Oct. 27, 2023.
The United States Patent and Trademark Office, Non-Final Office Action, U.S. Appl. No. 17/972,507, filed Jun. 20, 2024.
United States International Searching Authority; International Search Report & Written Opinion for PCT/US2024/017756; Jun. 17, 2024; 12 pages.
United States International Searching Authority; International Search Report & Written Opinion for PCT/US2024/017762; Jun. 17, 2024; 15 pages.
United States International Searching Authority; International Search Report & Written Opinion for PCT/US2023/077485; Feb. 21, 2024; 9 pages.

* cited by examiner

THIN STRIP CLASSIFICATION

CROSS-REFERENCE TO RELATED APPLICATIONS

This application claims priority to U.S. Provisional Patent Application Ser. No. 63/418,242 and to U.S. Provisional Patent Application Ser. No. 63/478,823, both of which are hereby incorporated by reference herein.

TECHNOLOGY FIELD

The present disclosure relates in general to the handling of materials, and in particular, to the classifying and/or sorting of materials.

BACKGROUND INFORMATION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Recycling is the process of collecting and processing materials that would otherwise be thrown away as trash, and turning them into new products. Recycling has benefits for communities and for the environment, since it reduces the amount of waste sent to landfills and incinerators, conserves natural resources, increases economic security by tapping a domestic source of materials, prevents pollution by reducing the need to collect new raw materials, and saves energy. After collection, recyclables are generally sent to a material recovery facility to be sorted, cleaned, and processed into materials that can be used in manufacturing.

The recycling of aluminum (Al) scrap is a very attractive proposition in that up to 95% of the energy costs associated with manufacturing can be saved when compared with the laborious extraction of the more costly primary aluminum. Primary aluminum is defined as aluminum originating from aluminum-enriched ore, such as bauxite. At the same time, the demand for aluminum is steadily increasing in markets, such as car manufacturing, because of its lightweight properties. As a result, there are certain economies available to the aluminum industry by developing a well-planned yet simple recycling plan or system. The use of recycled material would be a less expensive metal resource than a primary source of aluminum. As the amount of aluminum sold to the automotive industry (and other industries) increases, it will become increasingly necessary to use recycled aluminum to supplement the availability of primary aluminum.

Correspondingly, it is particularly desirable to efficiently separate aluminum scrap metals into alloy families, since mixed aluminum scrap of the same alloy family is worth much more than that of indiscriminately mixed alloys. For example, in the blending methods used to recycle aluminum, any quantity of scrap composed of similar, or the same, alloys and of consistent quality, has more value than scrap consisting of mixed aluminum alloys. Within such aluminum alloys, aluminum will always be the bulk of the material. However, constituents such as copper, magnesium, silicon, iron, chromium, zinc, manganese, and other alloy elements provide a range of properties to alloyed aluminum and provide a means to distinguish one aluminum alloy from the other. Each individual aluminum alloy is a mixture of alloys in which Aluminum (Al) is the predominant metal. Various other alloys, including Magnesium (Mg), Copper (Cu), Silicon (Si), Zinc (Zn), and other metals, are used to create each distinct aluminum alloy. As a result, each individual aluminum alloy has its own distinct chemistry and mechanical properties (and ranges) such as, tensile strength, yield strength, elongation, and other physical properties.

The Aluminum Association is the authority that defines the allowable limits for aluminum alloy chemical composition. The data for the aluminum wrought alloy chemical compositions is published by the Aluminum Association in "International Alloy Designations and Chemical Composition Limits for Wrought Aluminum and Wrought Aluminum Alloys," which was updated in January 2015, and which is incorporated by reference herein.

The International Alloy Designation System is the most widely accepted naming scheme for wrought alloys. Each alloy is given a four-digit number (xxxx), where the first digit (Xxxx) indicates the major alloying elements, the second digit (xXxx), if different from "0," indicates a variation of the alloy, and the third and fourth digits (xxXX) are arbitrary numbers used to identify the specific alloy in the series. For example, in aluminum alloy 3105, the first digit "3" indicates the aluminum alloy is in the manganese series, the second digit "1" indicates the first modification of the aluminum alloy 3005, and the third and fourth digits "05" identify the specific alloy in the 3000 series. In general, the 1xxx series of wrought aluminum alloys is composed essentially of pure aluminum with a minimum 99% aluminum content by weight; the 2xxx series is wrought aluminum principally alloyed with copper (Cu); the 3xxx series is wrought aluminum principally alloyed with manganese (Mn); the 4xxx series is wrought aluminum alloyed with silicon (Si); the 5xxx series is wrought aluminum primarily alloyed with magnesium (Mg); the 6xxx series is wrought aluminum principally alloyed with magnesium and silicon; the 7xxx series is wrought aluminum primarily alloyed with zinc (Zn); and the 8xxx series is a miscellaneous category. The Aluminum Association also has a similar document for cast aluminum alloys.

The presence of commingled pieces of different alloys in a body of scrap (i.e., a heterogeneous mixture) limits the ability of the mixture of scrap to be usefully recycled, unless the different alloys (or, at least, alloys belonging to different compositional families such as those designated by the Aluminum Association) can be separated (e.g., sorted) prior to re-melting. This is because, when commingled scrap of a plurality of different alloy compositions or composition families is re-melted, the resultant molten mixture contains proportions of the principal alloy and elements (or the different compositions) that are too high to satisfy the compositional limitations required in any particular commercial alloy.

Moreover, as evidenced by the production and sale of the Ford F-150 pickup having a considerable increase in its body and frame parts consisting of aluminum instead of steel, it is additionally desirable to recycle sheet metal scrap, including that generated in the manufacture of automotive components from sheet aluminum. Recycling of the scrap involves re-melting the scrap to provide a body of molten metal that can be cast and/or rolled into useful aluminum parts for further production of such vehicles. However, automotive manufacturing scrap (and metal scrap from other sources such as airplanes and commercial and household appliances) often includes a mixture of scrap pieces of wrought and cast pieces and/or two or more aluminum alloys differing substantially from each other in composition. A specific example of mixed manufacturing scrap of aluminum sheet, generated in certain present-day automotive manufacturing operations, is a mixture of pieces of one or more alloys of the Aluminum Association 5000 series and pieces of one or more alloys of the Aluminum Association 6000 series. Thus, those skilled in the aluminum alloy art will appreciate the difficulties of separating aluminum alloys, especially alloys that have been worked, such as cast, forged, extruded, rolled, and generally wrought alloys, into a reusable or recyclable worked product. These alloys for the most part are indistinguishable upon visual inspection or by other conventional scrap sorting techniques, such as density and/or eddy-current techniques. Therefore, it is a difficult task to separate, for example, 2000, 3000, 5000, 6000, and 7000 series alloys; moreover, the ability to sort between aluminum alloys within the same Aluminum Association series has not been accomplished in the prior art.

As a result, there are certain economies available to the aluminum industry by developing a well-planned yet simple recycling plan or system. The use of recycled material would be a less expensive metal resource than a primary source of aluminum. As the amount of aluminum sold to the automotive industry (and other industries) increases, it will become increasingly necessary to use recycled aluminum to supplement the availability of primary aluminum.

When x-ray fluorescence ("XRF") is utilized to classify materials transported on a moving conveyor belt for sorting, there is the possibility of the x-ray beam only partially illuminating the material piece, which can result in the capture of an inaccurate XRF spectrum needed to classify the material piece. For example, this can lead to an improper classification and sortation of high copper aluminum alloys.

DETAILED DESCRIPTION

Figure 1:
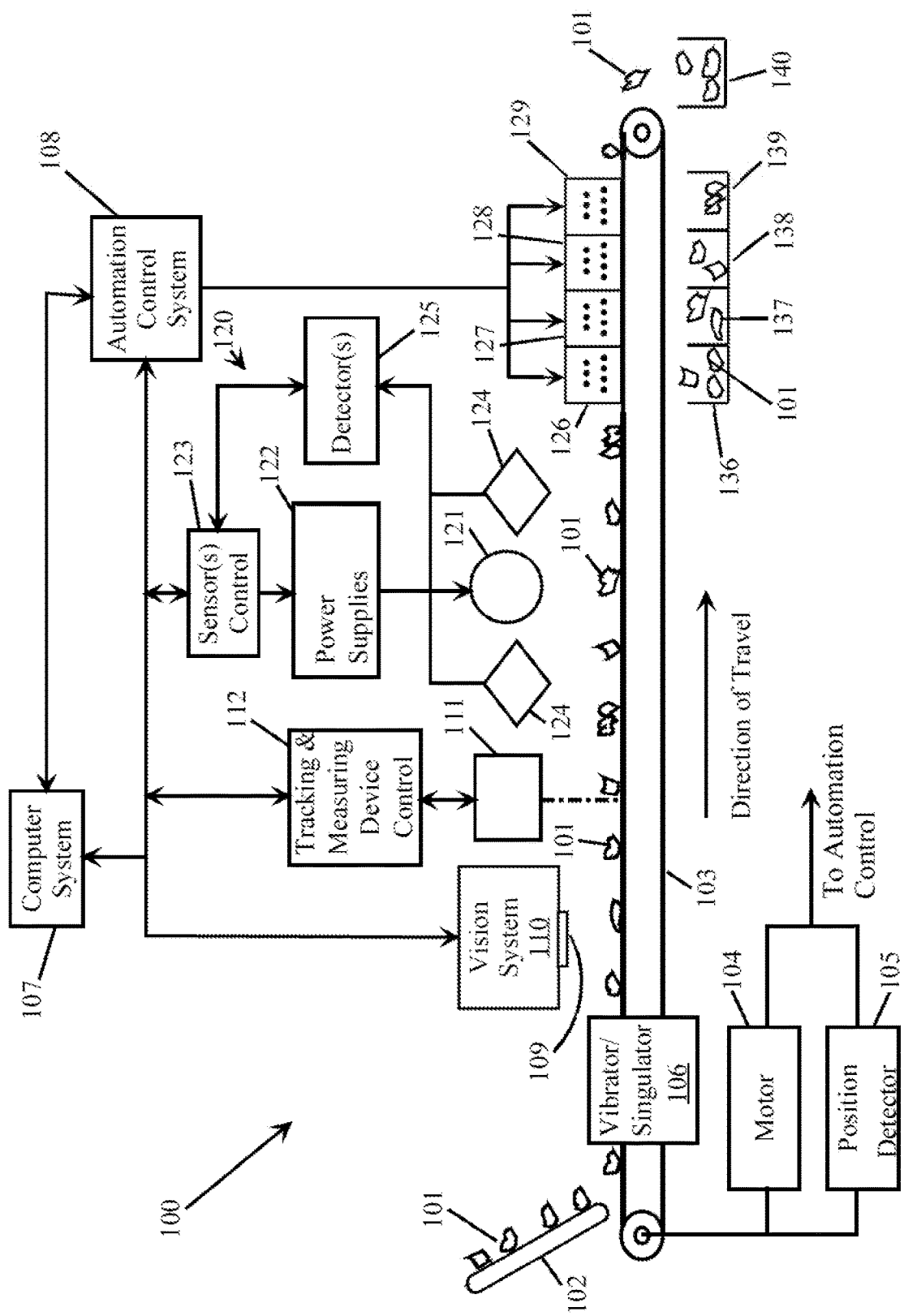
FIG. 1 illustrates a schematic diagram of a material handling system configured in accordance with embodiments of the present disclosure.

Various detailed embodiments of the present disclosure are disclosed herein. However, it is to be understood that the disclosed embodiments are merely exemplary of the disclosure, which may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to employ various embodiments of the present disclosure.

As used herein, "materials" may include any item or object, including but not limited to, metals (ferrous and/or nonferrous), metal alloys (e.g., aluminum alloys), Heavies, Zorba, Twitch, pieces of metal embedded in another different material, plastics/polymers (including, but not limited to, any of the plastics/polymers disclosed herein, known in the industry, or newly created in the future), rubber, foam, glass (including, but not limited to, borosilicate or soda lime glass, and various colored glass), ceramics, paper, cardboard, Teflon, PE, bundled wires, insulation covered wires, rare earth elements, leaves, wood, plants, parts of plants, textiles, bio-waste, packaging, electronic waste, batteries and accumulators, scrap from end-of-life vehicles, mining, construction, and demolition waste, crop wastes, forest residues, purpose-grown grasses, woody energy crops, microalgae, food waste, hazardous chemical and biomedical wastes, construction debris, farm wastes, biogenic items, non-biogenic items, objects with a specific carbon content, any other objects that may be found within municipal solid waste, and any other objects, items, or materials disclosed herein, including further types or classes of any of the foregoing that can be distinguished from each other, including but not limited to, by one or more sensor systems, including but not limited to, any of the sensor technologies disclosed herein.

In a more general sense, a "material" may include any item or object composed of a chemical element, a compound or mixture of chemical elements, or a compound or mixture of a compound or mixture of chemical elements, wherein the complexity of a compound or mixture may range from being simple to complex (all of which may also be referred to herein as a material having a specific "chemical composition" (also referred to herein as a specific "material composition")). "Chemical element" means a chemical element of the periodic table of chemical elements, including chemical elements that may be discovered after the filing date of this application. Within this disclosure, the terms "scrap," "scrap pieces," "materials," "material pieces," and "material scrap pieces" may be used interchangeably. As used herein, a material piece or scrap piece referred to as having a metal alloy composition is a metal alloy having a specific chemical composition that distinguishes it from other metal alloys. As used herein, a "contaminant" is any material, or a component of a material piece, that is to be excluded from a group of sorted materials.

As used herein, the term "predetermined" refers to something that has been established or decided in advance, such as by a user of embodiments of the present disclosure.

As used herein, "spectral imaging" is imaging that uses one or more bands across the electromagnetic spectrum. While a typical camera captures images composed of light across three wavelength bands in the visible spectrum (e.g., red, green, and blue (RGB)), spectral imaging may encompass a wide variety of techniques that include and go beyond the typical visible spectrum. For example, spectral imaging may use the infrared, visible, ultraviolet, and/or x-ray spectrums, or some combination of the above. Spectral data, or spectral image data, is a digital data representation of a spectral image. Spectral imaging may include the acquisition of spectral data in visible and non-visible bands simultaneously, illumination from outside the visible range, or the use of optical filters to capture a specific spectral range. It is also possible to capture hundreds of wavelength bands for each pixel in a spectral image.

As used herein, the term "image data packet" refers to a packet of digital data pertaining to a captured spectral image of an individual material piece.

As used herein, the term "sort," and any derivatives thereof, refers to the physical separation of certain material pieces (e.g., specifically classified material pieces) from other material pieces.

As used herein, the terms "identify" and "classify," the terms "identification" and "classification," and any derivatives of the foregoing, may be utilized interchangeably. As used herein, to "classify" a material piece is to assign or determine (i.e., identify) a type or class of materials to which the material piece belongs. For example, in accordance with certain embodiments of the present disclosure, a sensor system (as further described herein) may be configured to capture (collect) and analyze any type of information for classifying materials and distinguishing such classified materials from other materials, which classifications can be utilized within a sorting system to selectively sort material pieces as a function of a set of one or more physical and/or chemical characteristics (e.g., which may be user-defined), including but not limited to, color, texture, hue, shape, brightness, weight, density, chemical composition, size, uniformity, manufacturing type, chemical signature, predetermined fraction, radioactive signature, transmissivity to light, sound, or other signals, and reaction to stimuli such as various fields, including emitted and/or reflected electromagnetic radiation ("EM") of the material pieces.

The types or classes (i.e., classifications) of material pieces may be user-definable (e.g., predetermined) and not limited to any known classification(s) of materials. The granularity of the types or classes may range from very coarse to very fine. For example, the types or classes may include plastics, ceramics, glasses, metals, and other materials, where the granularity of such types or classes is relatively coarse; different metals and metal alloys such as, for example, zinc, copper, brass, chrome plate, and aluminum, where the granularity of such types or classes is finer; or between specific types of metal alloys, where the granularity of such types or classes is relatively fine. Thus, the types or classes may be configured to distinguish between materials of significantly different chemical compositions such as, for example, plastics and metal alloys, or to distinguish between materials of almost identical chemical compositions such as, for example, different types of metal alloys. It should be appreciated that the methods and systems discussed herein may be applied to accurately identify/classify material pieces for which the chemical composition is completely unknown before being classified.

Figure 14:
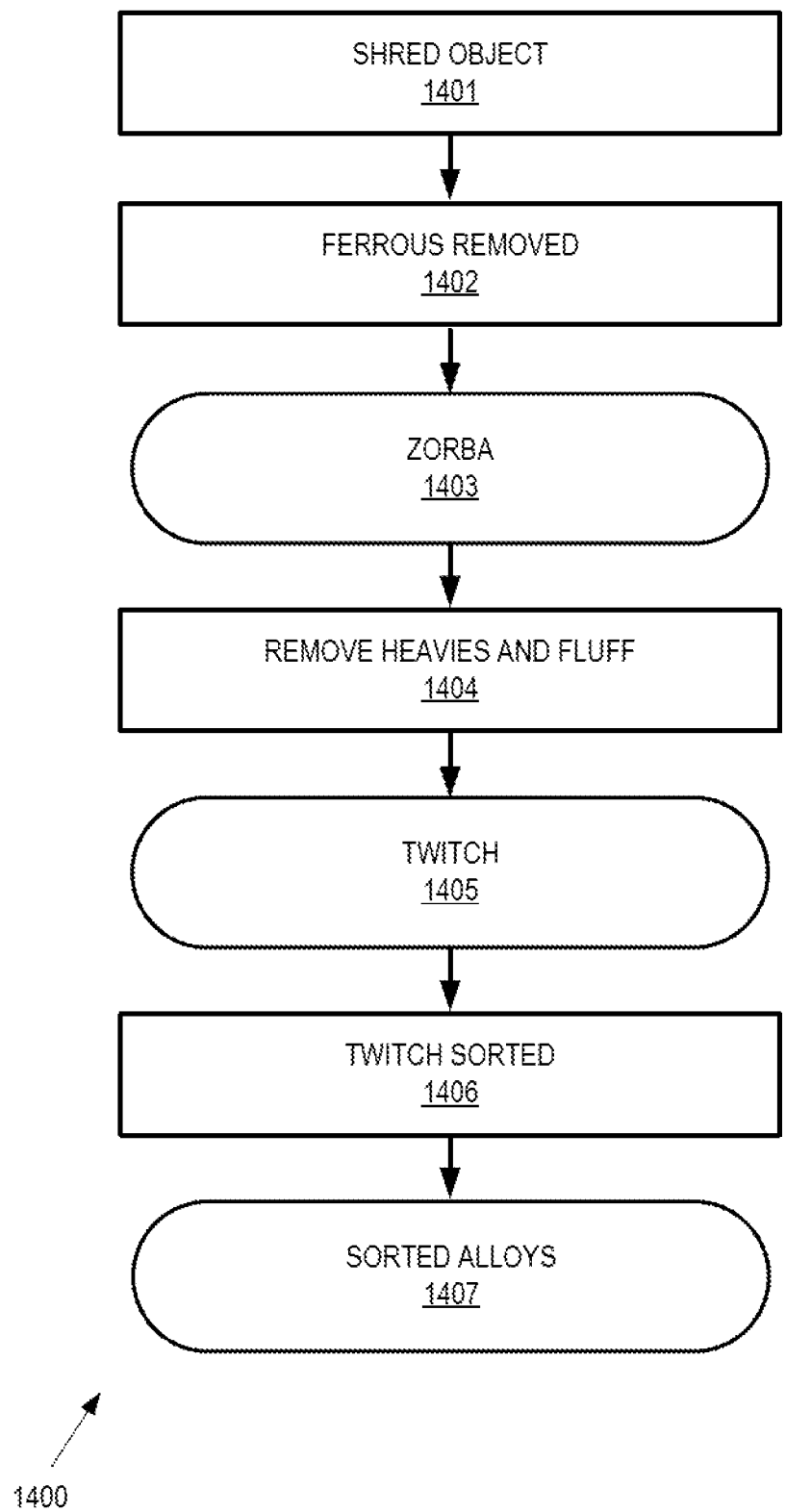
FIG. 14 illustrates a flowchart diagram of a process for recycling end-of-life ("EOL") objects, including, but not limited to, vehicles, aircraft, or appliances.

FIG. 14 illustrates a flowchart diagram of a process, or series of processes, 1400 for recycling end-of-life ("EOL") objects, including, but not limited to, vehicles, aircraft, or appliances. The various steps and/or stages of the process 1400 may be performed independently from each other by different parties. In the process block 1401, an object is shredded, for example, by a commercial shredder, which produces EOL scrap. Often, such objects are EOL vehicles, aircraft, and/or appliances. A typical following step 1402 is the removal of any ferrous materials from the scrap, such as by magnets. With respect to shredded objects containing one or more metals or metal alloys, such as vehicles, aircraft, and/or appliances, the remaining non-ferrous scrap is often referred to as Zorba 1403. Another often utilized process 1404 is the use of separating/sorting techniques to remove various certain materials from the Zorba 1403, such as Heavies and fluff (e.g., foam, fabrics, wood, etc.). The remaining scrap is often then referred to as Twitch 1405, which may include various aluminum alloys. It is often desired to then sort the Twitch 1405 in accordance with one or more various processes 1406, which can produce sorted alloys 1407. Embodiments of the present disclosure may be implemented within one or more of the processes 1402, 1404, 1406.

The systems and methods described herein according to certain embodiments of the present disclosure receive a heterogeneous mixture of a plurality of material pieces (e.g., EOL scrap, Zorba, Heavies, or Twitch), wherein at least one material piece within this heterogeneous mixture includes a chemical composition different from one or more other material pieces and/or at least one material piece within this heterogeneous mixture is physically distinguishable from other material pieces, and/or at least one material piece within this heterogeneous mixture is of a class or type of material different from the other material pieces within the mixture, and the systems and methods are configured to identify/classify/distinguish/sort this one material piece into a group separate from such other material pieces. Embodiments of the present disclosure may be utilized to sort any types or classes of materials as defined herein. By way of contrast, a homogeneous set or group of materials all fall within the same identifiable class or type of material.

Though all embodiments of the present disclosure may be utilized to classify/sort any type of material as defined herein, embodiments of the present disclosure are hereinafter described for classifying/sorting pieces of metal alloy scrap (also referred to as "metal alloy scrap pieces"), including aluminum alloy scrap pieces.

Within x-ray fluorescence ("XRF") spectroscopy, the use of characteristic x-rays emitted under excitation provides a method for identification of elements and their relative amounts present in different materials, which can then be utilized to classify each of the materials. The energy of emitted x-rays depends on the atomic number of the fluorescing elements. Energy-resolving detectors are then used to detect the different energy levels at which x-rays are fluoresced, and generate an x-ray fluorescence signal from the detected x-rays. This x-ray fluorescence signal may then be used to build an energy spectrum (also referred to as an "XRF spectrum") of the detected x-rays, and from the information, the element or elements in the material that produced the x-rays may be identified. Fluorescent x-rays are emitted isotopically from an irradiated element, and the detected radiation depends on the solid angle subtended by the detector and any absorption of this radiation prior to the radiation reaching the detector. The lower the energy of an x-ray, the shorter the distance it will travel before being absorbed by air. Thus, when detecting x-rays, the amount of x-rays detected is a function of the quantity of x-rays emitted, the energy level of the emitted x-rays, the emitted x-rays absorbed in the transmission medium (e.g., air and/or a non-vacuumed environment, or a vacuumed environment), the angles between the detected x-rays and the detector, and the distance between the detector and the irradiated material.

These x-rays cause each material piece to fluoresce x-rays at various energy levels, depending on the elements contained in the material piece. The fluoresced x-rays are detected, and the material piece can then be classified based on the fluoresced x-rays. The material piece may then be sorted in accordance with (as a function of) this classification.

Within embodiments of the present disclosure, x-ray fluorescence detected from a material piece is utilized to identify some or all of the elements present within the material piece, including the quantities or relative quantities of such elements. Embodiments of the present disclosure then utilize the identification of such elements to identify the type of material (e.g., a specific aluminum alloy) pertaining to the detected fluoresced x-rays. Furthermore, embodiments of the present disclosure utilize the identification of the elements within the material piece in order to classify the material piece according to a predetermined standard. For example, in accordance with embodiments of the present disclosure, x-ray fluorescence detected from an aluminum alloy material (e.g., an aluminum alloy scrap piece) may be utilized to assign an aluminum alloy classification to the material piece (including in accordance with the aluminum alloy classifications designated by the Aluminum Association).

Embodiments of the present disclosure will be described herein as classifying/sorting material pieces into such separate groups by physically depositing (e.g., ejecting) the material pieces into separate receptacles or bins as a function of user-defined groupings (e.g., material piece classifications). As an example, within embodiments of the present disclosure, material pieces are sorted into separate receptacles in order to separate material pieces composed of a particular material composition, or compositions, from other material pieces composed of a different material composition. Moreover, embodiments of the present disclosure may be configured to sort aluminum alloy scrap pieces into separate receptacles so that substantially all of the aluminum alloy scrap pieces having a material composition falling within one of the aluminum alloy series published by the Aluminum Association are sorted into a single receptacle (for example, a receptacle may correspond to one or more particular aluminum alloy series (e.g., 1xxx, 2xxx, 3xxx, 4xxx, 5xxx, 6xxx, 7xxx, 8xxx)).

Furthermore, as will be described herein, embodiments of the present disclosure may be configured to sort aluminum alloy scrap pieces into separate receptacles as a function of a classification of their alloy composition even if such alloy compositions falls within the same Aluminum Association series. As a result, a sorting system configured in accordance with embodiments of the present disclosure can classify and sort aluminum alloy scrap pieces having compositions that would all classify them into a single aluminum alloy series (e.g., the 5xxx series or the 6xxx series) into separate receptacles as a function of their aluminum alloy composition. For example, embodiments of the present disclosure can classify and sort into separate receptacles aluminum alloy scrap pieces classified as aluminum alloy 5086 separate from aluminum alloy scrap pieces classified as aluminum alloy 5022.

FIG. 1 illustrates an example of a material handling system 100 configured in accordance with various embodiments of the present disclosure. A conveyor system 103 may be implemented to convey individual material pieces 101 through the material handling system 100 so that each of the individual material pieces 101 can be tracked, classified, distinguished, and/or sorted into predetermined desired groups (e.g., classifications). Such a conveyor system 103 may be implemented with one or more conveyor belts on which the material pieces 101 travel, typically at a predetermined constant speed. However, certain embodiments of the present disclosure may be implemented with other types of conveyor systems, including a system in which the material pieces free fall past one or more of the various components of the material handling system 100 (or any other type of vertical sorter, or any of the other conveyor systems disclosed herein). Hereinafter, wherein applicable, the conveyor system 103 may also be referred to as the conveyor belt 103. In one or more embodiments, some or all of the acts or functions of conveying, capturing, stimulating, detecting, classifying, distinguishing, and sorting may be performed automatically, i.e., without human intervention. For example, in the material handling system 100, one or more cameras, one or more vision systems, one or more sources of stimuli, one or more emissions detectors, one or more classification modules, a sorting apparatus, and/or other system components may be configured to perform these and other operations automatically.

Figure 8:
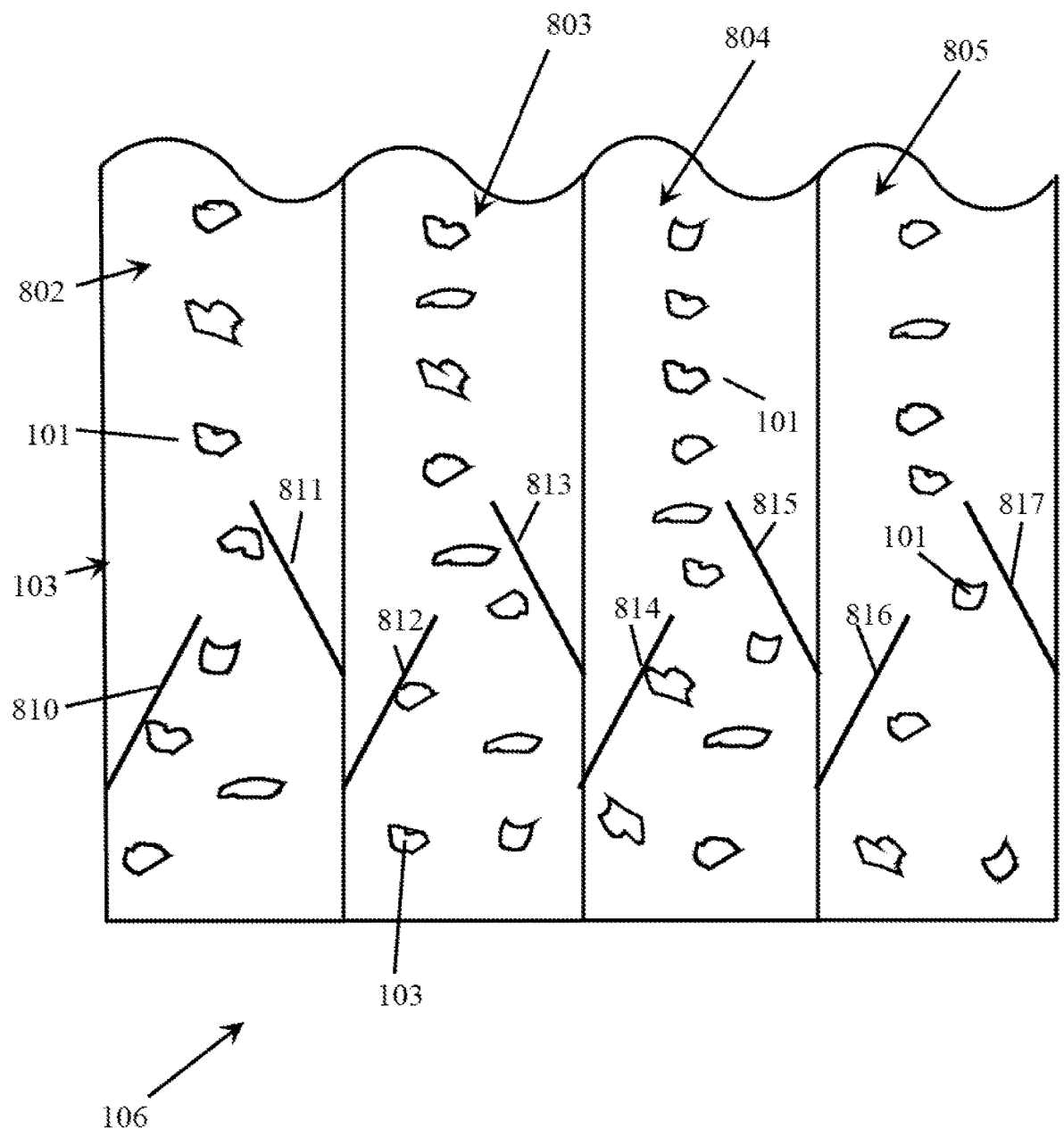
FIG. 8 illustrates an example of a singulator.

Furthermore, though the simplified illustration in FIG. 1 depicts a single stream of material pieces 101 on a conveyor belt 103, embodiments of the present disclosure may be implemented in which a plurality of such streams of material pieces are passing by the various components of the material handling system 100 in parallel with each other (e.g., see FIG. 8). In accordance with certain embodiments of the present disclosure, some sort of suitable feeder mechanism (e.g., another conveyor system, bowl feeder, or hopper 102) may be utilized to feed the material pieces 101 onto the conveyor system 103, whereby the conveyor system 103 conveys the material pieces 101 past various components within the material handling system 100. In accordance with certain embodiments of the present disclosure, a tumbler and/or a vibrator may be utilized to separate the individual material pieces from a collection (e.g., a physical pile) of material pieces. In accordance with certain embodiments of the present disclosure, the material pieces may be positioned into one or more singulated (i.e., single file) streams, which may be performed by an active or passive singulator 106. An example of a passive singulator is further described with respect to FIG. 8, and in U.S. Pat. No. 10,207,296.

As such, certain embodiments of the present disclosure are capable of simultaneously tracking, classifying, distinguishing, and/or sorting such travelling streams of material pieces. Alternatively, the conveyor system (e.g., the conveyor belt 103) may simply convey a collection of material pieces, which have been deposited onto the conveyor belt 103, in a random manner. As such, in accordance with certain embodiments of the present disclosure, singulation of the material pieces 101 is not required to track, classify, distinguish, and/or sort the material pieces.

Within certain embodiments of the present disclosure, the conveyor system 103 is operated to travel at a predetermined speed by a conveyor system motor 104. This predetermined speed may be programmable and/or adjustable by the operator in any well-known manner. Within certain embodiments of the present disclosure, control of the conveyor system motor 104 and/or the position detector 105 may be performed by an automation control system 108. Such an automation control system 108 may be operated under the control of a computer system 107, and/or the functions for performing the automation control may be implemented in software within the computer system 107. If the conveyor system 103 is a conveyor belt, then it may be a conventional endless belt conveyor employing a conventional drive motor 104 suitable to move the conveyor belt 103 at the predetermined speeds.

A position detector 105 (e.g., a conventional encoder) may be operatively coupled to the conveyor belt 103 and the automation control system 108 to provide information corresponding to the movement (e.g., speed) of the conveyor belt 103. Thus, as will be further described herein, through the utilization of the controls to the conveyor belt drive motor 104 and/or the automation control system 108 (and alternatively including the position detector 105), as each of the material pieces 101 travelling on the conveyor belt 103 are identified, they can be tracked by location and time (relative to the various components of the material handling system 100) so that the various components of the material handling system 100 can be activated/deactivated as each material piece 101 passes within their vicinity. As a result, the automation control system 108 is able to track the location of each of the material pieces 101 while they travel along the conveyor belt 103.

Referring again to FIG. 1, certain embodiments of the present disclosure may utilize a vision, or optical recognition, system 110 as a means to track each of the material pieces 101 as they travel on the conveyor system 103, which may utilize one or more still or live action cameras 109 to note the position (i.e., location and timing) of each of the material pieces 101 on the moving conveyor system 103. The vision system 110 may be further, or alternatively, configured to perform certain types of identification (e.g., classification) of all or a portion of the material pieces 101, as will be further described herein. For example, such a vision system 110 may be utilized to capture or acquire information about each of the material pieces 101. For example, the vision system 110 may be configured (e.g., with an artificial intelligence ("AI") system as further described herein) to capture or collect any type of information from the material pieces that can be utilized within the material handling system 100 to classify and/or selectively sort the material pieces 101 as a function of a set of one or more characteristics (e.g., physical and/or chemical and/or radioactive, etc.) as described herein. In accordance with certain embodiments of the present disclosure, the vision system 110 may be configured to capture visual images of each of the material pieces 101 (including one-dimensional, two-dimensional, three-dimensional, or holographic imaging), for example, by using an optical sensor as utilized in typical digital cameras and video equipment. Such visual images captured by the optical sensor are then stored in a memory device as image data (e.g., formatted as image data packets). In accordance with certain embodiments of the present disclosure, such image data may represent images captured within optical wavelengths of light (i.e., the wavelengths of light that are observable by the typical human eye). However, alternative embodiments of the present disclosure may utilize sensor systems that are configured to capture an image of a material made up of wavelengths of light outside of the visual wavelengths of the human eye.

In accordance with certain embodiments of the present disclosure, the vision system 110 may implement a machine vision system for analyzing and/or determining the shapes, or relative shapes, of each of the material pieces 101, such as might be implemented within LabVIEW.

In accordance with certain embodiments of the present disclosure, the material handling system 100 may be implemented with one or more sensor systems 120, which may be utilized solely or in combination with the vision system 110 to classify/identify/distinguish material pieces 101. A sensor system 120 may be configured with any type of sensor technology, including sensors utilizing irradiated or reflected electromagnetic radiation (e.g., utilizing infrared ("IR"), Fourier Transform IR ("FTIR"), Forward-looking Infrared ("FLIR"), Very Near Infrared ("VNIR"), Near Infrared ("NIR"), Short Wavelength Infrared ("SWIR"), Long Wavelength Infrared ("LWIR"), Medium Wavelength Infrared ("MWIR" or "MIR"), X-Ray Transmission ("XRT"), Gamma Ray, Ultraviolet ("UV"), X-Ray Fluorescence ("XRF"), Laser Induced Breakdown Spectroscopy ("LIBS"), Raman Spectroscopy, Anti-stokes Raman Spectroscopy, Gamma Spectroscopy, Hyperspectral Spectroscopy (e.g., any range beyond visible wavelengths), Acoustic Spectroscopy, NMR Spectroscopy, Microwave Spectroscopy, Terahertz Spectroscopy, including one-dimensional, two-dimensional, or three-dimensional imaging with any of the foregoing), or by any other type of sensor technology, including but not limited to, chemical or radioactive. Implementation of an exemplary XRF system (e.g., for use as a sensor system 120 herein) is further described in U.S. Pat. No. 10,207,296.

The sensor system(s) 120 may include an energy emitting source 121, which may be powered by a power supply 122, for example, in order to stimulate a response from each of the material pieces 101. Within certain embodiments of the present disclosure, as each material piece 101 passes within proximity to the emitting source 121, the sensor system 120 may emit an appropriate sensing signal towards the material piece 101. One or more detectors 124 may be positioned and configured to sense/detect one or more characteristics from the material piece 101 in a form appropriate for the type of utilized sensor technology. The one or more detectors 124 and the associated detector electronics 125 capture these received sensed characteristics to perform signal processing thereon and produce digitized information representing the sensed characteristics (e.g., spectral data), which is then analyzed in accordance with certain embodiments of the present disclosure, which may be used to classify each of the material pieces 101.

It should be noted that though FIG. 1 is illustrated with a combination of a vision system 110 and one or more sensor systems 120, embodiments of the present disclosure may be implemented with any combination of sensor systems utilizing any of the sensor technologies disclosed herein, or any other sensor technologies currently available or developed in the future. Within certain embodiments of the present disclosure, a combination of both the vision system 110 and one or more sensor systems 120 may be used to classify the material pieces 101. Furthermore, embodiments of the present disclosure may include any combinations of one or more sensor systems and/or vision systems in which the outputs of such sensor/vision systems are processed within an AI system (as further disclosed herein) in order to classify/ identify/distinguish materials from a heterogeneous mixture of materials, which can then be sorted from each other.

In accordance with certain embodiments of the present disclosure, the vision system 110 may be configured to capture additional information about each material piece, including information that a separate sensor system cannot gather alone. For example, the vision system 110 may be configured to capture information about color, size, shape, and/or uniformity of a material piece that can aid in the identification/classification of a material piece. Additionally, the vision system 110 may be configured to identify material pieces that are not desired and can send a signal to reject the material pieces before they reach the sensor system(s).

In accordance with certain embodiments of the present disclosure, a vision system 110 and/or sensor system(s) may be configured to identify which of the material pieces 101 are not of the kind to be sorted by the material handling system 100, and send a signal to reject such material pieces. In such a configuration, the identified material pieces 101 may be diverted/ejected utilizing one of the mechanisms as described hereinafter for physically diverting sorted material pieces into individual receptacles.

Within certain embodiments of the present disclosure, a material piece tracking device 111 and accompanying control system 112 may be utilized and configured to determine the sizes and/or shapes of each of the material pieces 101 as they pass within proximity of the material piece tracking device 111, along with the position (i.e., location and timing) of each of the material pieces 101 on the moving conveyor system 103. An exemplary operation of such a material piece tracking device 111 and control system 112 is further described in U.S. Pat. No. 10,207,296. Alternatively, as previously disclosed, the vision system 110 may be utilized to track the position (i.e., location and timing) of each of the material pieces 101 as they are transported by the conveyor system 103. As such, certain embodiments of the present disclosure may be implemented without a material piece tracking device (e.g., the material piece tracking device 111) to track the material pieces.

In accordance with certain embodiments of the present disclosure, the material tracking device 111 may be implemented before (e.g., upstream on the conveyor system) the vision system 110 and/or the sensor system 120 so that when a material piece 101 is detected by the material tracking system 111, it triggers the material handling system 100 for when the vision system 110 and/or the sensor system 120 are to capture characteristics of the material piece. Furthermore, the order in which the vision system 110 and the sensor system 120 are implemented within the material handling system 100 can be interchanged.

Classification of material pieces, which may be performed within the computer system 107, may be utilized by the automation control system 108 to activate one of the N (N≥1) sorting devices 126 . . . 129 of a sorting apparatus for sorting (e.g., diverting/ejecting) the material pieces 101 into one or more N (N≥1) sorting receptacles 136 . . . 139 according to the determined classifications. Four sorting devices 126 . . . 129 and four sorting receptacles 136 . . . 139 associated with the sorting devices are illustrated in FIG. 1 as merely a non-limiting example.

The sorting apparatus may include any well-known mechanisms for redirecting selected material pieces 101 towards a desired location, including, but not limited to, diverting the material pieces 101 from the conveyor belt system into the plurality of sorting receptacles. For example, a sorting device may utilize air jets, with each of the air jets assigned to one or more of the classifications. When one or more of the air jets (e.g., 127) receives a signal from the automation control system 108, the air jet(s) emits a stream of air that causes a material piece 101 to be diverted/ejected from the conveyor system 103 into a sorting receptacle (e.g., 137) (or onto another conveyor system) corresponding to that air jet.

Although the example illustrated in FIG. 1 uses air jets to divert/eject material pieces, other mechanisms may be used to divert/eject the material pieces, such as robotically removing the material pieces from the conveyor belt, pushing the material pieces from the conveyor belt (e.g., with paint brush type plungers), causing an opening (e.g., a trap door) in the conveyor system 103 from which a material piece may drop, or using air jets to separate the material pieces into separate receptacles as they fall from the edge of the conveyor belt. A pusher device, as that term is used herein, may refer to any form of device which may be activated to dynamically displace an object on or from a conveyor system/device, employing pneumatic, mechanical, or other means to do so, such as any appropriate type of mechanical pushing mechanism (e.g., an ACME screw drive), pneumatic pushing mechanism, or air jet pushing mechanism.

In addition to the N sorting receptacles 136 . . . 139 into which material pieces 101 are diverted/ejected, the material handling system 100 may also include a receptacle 140 that receives material pieces 101 not diverted/ejected from the conveyor system 103 into any of the aforementioned sorting receptacles 136 . . . 139. For example, a material piece 101 may not be diverted/ejected from the conveyor system 103 into one of the N sorting receptacles 136 . . . 139 when the classification of the material piece 101 is not determined (or simply because the sorting devices failed to adequately divert/eject a piece). Thus, the receptacle 140 may serve as a default receptacle into which unclassified or unsorted material pieces are dumped. Alternatively, the receptacle 140 may be used to receive one or more classifications of material pieces that have deliberately not been assigned to any of the N sorting receptacles 136 . . . 139. These such material pieces may then be further sorted in accordance with other characteristics and/or by another sorting system.

Depending upon the variety of classifications of material pieces desired, multiple classifications may be mapped to a single sorting device and associated sorting receptacle. In other words, there need not be a one-to-one correlation between classifications and sorting receptacles. For example, it may be desired by the user to sort certain classifications of materials into the same sorting receptacle. To accomplish this sort, when a material piece 101 is classified as falling into a predetermined grouping of classifications, the same sorting device may be activated to sort these into the same sorting receptacle. Such combination sorting may be applied to produce any desired combination of sorted material pieces. The mapping of classifications may be programmed by the user (e.g., using any of the sorting algorithms, as described herein, operated by the computer system 107) to produce such desired combinations. Additionally, the classifications of material pieces are user-definable, and not limited to any particular known classifications of material pieces.

With material handling systems 100 implementing an XRF system for a sensor system 120, signals representing the detected XRF spectrum may be converted into a discrete energy histogram such as on a per-channel (i.e., element) basis, as further described herein. Such a conversion process may be implemented within the control system 123 or the computer system 107. Within certain embodiments of the present disclosure, such a control system 123 or computer system 107 may include a commercially available spectrum acquisition module, such as the commercially available Amptech MCA 5000 acquisition card and software programmed to operate the card. Such a spectrum acquisition module, or other software implemented within the material handling system 100, may be configured to implement a plurality of channels for dispersing x-rays into a discrete energy spectrum (i.e., histogram) with such a plurality of energy levels, whereby each energy level corresponds to an element that the material handling system 100 has been configured to detect. The material handling system 100 may be configured so that there are sufficient channels corresponding to certain elements within the chemical periodic table, which are important for distinguishing between different materials. The energy counts for each energy level may be stored in a separate collection storage register. The computer system 107 then reads each collection register to determine the number of counts for each energy level during the collection interval, and build the energy histogram. A sorting algorithm configured in accordance with certain embodiments of the present disclosure may then utilize this collected histogram of energy levels to classify at least certain ones of the material pieces 101 and/or assist the vision system 110 in classifying the material pieces 101.

As previously disclosed, the vision system 110 may be configured with an AI system to capture or collect any type of information from the material pieces that can be utilized within the material handling system 100 to classify and/or selectively sort the material pieces 101 as a function of a set of one or more characteristics. An AI system may implement any well-known AI system (e.g., Artificial Narrow Intelligence ("ANI"), Artificial General Intelligence ("AGI"), and Artificial Super Intelligence ("ASI")), a machine learning system including one that implements a neural network (e.g., artificial neural network, deep neural network, convolutional neural network, recurrent neural network, autoencoders, reinforcement learning, etc.), a machine learning system implementing supervised learning, unsupervised learning, semi-supervised learning, reinforcement learning, self-learning, feature learning, sparse dictionary learning, anomaly detection, robot learning, association rule learning, fuzzy logic, deep learning algorithms, deep structured learning hierarchical learning algorithms, support vector machine ("SVM") (e.g., linear SVM, nonlinear SVM, SVM regression, etc.), decision tree learning (e.g., classification and regression tree ("CART"), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), and/or deep machine learning algorithms, such as those described in and publicly available at the deeplearning.net website (including all software, publications, and hyperlinks to available software referenced within this website), which is hereby incorporated by reference herein. Non-limiting examples of publicly available machine learning software and libraries that could be utilized within embodiments of the present disclosure include Python, OpenCV, Inception, Theano, Torch, PyTorch, Pylearn2, Numpy, Blocks, TensorFlow, MXNet, Caffe, Lasagne, Keras, Chainer, Matlab Deep Learning, CNTK, MatConvNet (a MATLAB toolbox implementing convolutional neural networks for computer vision applications), DeepLearnToolbox (a Matlab toolbox for Deep Learning (from Rasmus Berg Palm)), BigDL, Cuda-Convnet (a fast C++/CUDA implementation of convolutional (or more generally, feed-forward) neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT (Python code using CUDAMat and Gnumpy to train models of natural images), ConvNet, Elektronn, OpenNN, NeuralDesigner, Theano Generalized Hebbian Learning, Apache Singa, Lightnet, and SimpleDNN.

In accordance with certain embodiments of the present disclosure, certain types of machine learning may be performed in stages. For example, first, training occurs, which may be performed offline in that the material handling system 100 is not being utilized to perform actual classifying/sorting of material pieces. The material handling system 100 may be utilized to train the machine learning system in that homogenous sets (also referred to herein as control samples) of material pieces (i.e., having the same types or classes of materials, or falling within the same predetermined fraction) are passed through the material handling system 100 (e.g., by a conveyor system 103); and all such material pieces may not be sorted, but may be collected in a common receptacle (e.g., receptacle 140). Alternatively, the training may be performed at another location remote from the material handling system 100, including using some other mechanism for collecting sensed information (characteristics) of control sets of material pieces. During this training stage, algorithms within the machine learning system extract features from the captured information (e.g., using image processing techniques well known in the art). Non-limiting examples of training algorithms include, but are not limited to, linear regression, gradient descent, feed forward, polynomial regression, learning curves, regularized learning models, and logistic regression. It is during this training stage that the algorithms within the machine learning system learn the relationships between materials and their features/characteristics (e.g., as captured by the vision system and/or sensor system(s)), creating a knowledge base for later classification of a heterogeneous mixture of material pieces received by the material handling system 100, which may then be sorted by desired classifications. Such a knowledge base may include one or more libraries, wherein each library includes parameters (e.g., neural network parameters) for utilization by the machine learning system in classifying material pieces. For example, one particular library may include parameters configured by the training stage to recognize and classify a particular type or class of material, or one or more material that fall with a predetermined fraction. In accordance with certain embodiments of the present disclosure, such libraries may be inputted into the machine learning system and then the user of the material handling system 100 may be able to adjust certain ones of the parameters in order to adjust an operation of the material handling system 100 (for example, adjusting the threshold effectiveness of how well the machine learning system recognizes a particular material piece from a heterogeneous mixture of materials).

Additionally, the inclusion of certain materials in material pieces result in identifiable physical features (e.g., visually discernible characteristics) in materials. As a result, when a plurality of material pieces containing such a particular composition are passed through the aforementioned training stage, the machine learning system can learn how to distinguish such material pieces from others. Consequently, a machine learning system (or any AI system) configured in accordance with certain embodiments of the present disclosure may be configured to sort between material pieces as a function of their respective material/chemical compositions. It can be readily appreciated that embodiments of the present disclosure may be configured to utilize image data (e.g., visual images) of a material piece as a proxy for representations of one or more various physical and/or chemical attributes of the material piece (e.g., ductility, malleability, brittleness, hardness, luster, tensile strength, reactionary with various materials, etc.).

Figure 2:
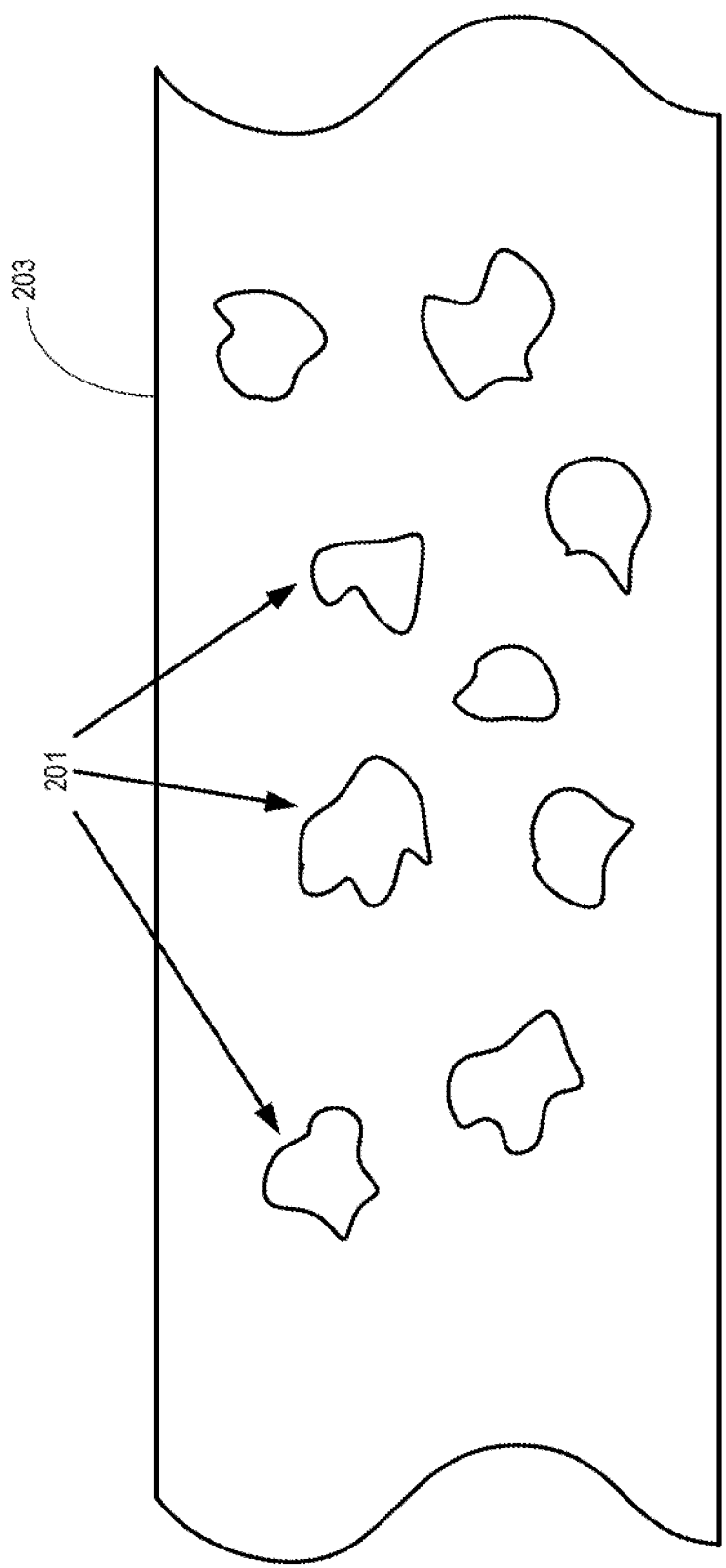
FIG. 2 illustrates an exemplary representation of a control set of material pieces used during a training stage in an artificial intelligence ("AI") system.

Referring to FIG. 2, during the training stage, a plurality of material pieces 201 of one or more specific types, classifications, or fractions of material(s), which are the control samples, may be delivered past the vision system and/or one or more sensor systems(s) (e.g., by a conveyor system 203) so that the algorithms within the machine learning system detect, extract, and learn what features represent such a type or class of material. For example, each of the material pieces 201 in the control sample may be first passed through such a training stage so that the algorithms within the machine learning system "learn" (are trained) how to detect, recognize, and classify such material pieces 201. In the case of training a vision system (e.g., the vision system 110), trained to visually discern (distinguish) between material pieces. This creates a library of parameters particular to such a homogenous class of material pieces 201. The same process can be performed with respect to images of any classification of material pieces creating a library of parameters particular to such classification of material pieces. For each type of material to be classified by the vision system, any number of exemplary material pieces of that classification of material may be passed by the vision system. Given captured sensed information as input data, the algorithms within the machine learning system may use N classifiers, each of which test for one of N different material types. Note that the machine learning system may be "taught" (trained) to detect any type, class, or fraction of material, including any of the types, classes, or fractions of materials disclosed herein.

After the algorithms have been established and the machine learning system has sufficiently learned (been trained) the differences (e.g., visually discernible differences) for the material classifications (e.g., within a user-defined level of statistical confidence), the libraries for the different material classifications are then implemented into a material classifying/sorting system (e.g., the material handling system 100) to be used for identifying, distinguishing, and/or classifying material pieces from a heterogeneous mixture of material pieces, and then possibly sorting such classified material pieces if sorting is to be performed.

It should be understood that the present disclosure is not exclusively limited to AI techniques. Other common techniques for material classification/identification may also be used. For instance, a sensor system may utilize optical spectrometric techniques using multi- or hyper-spectral cameras to provide a signal that may indicate the presence or absence of a type, class, or fraction of material by examining the spectral emissions (i.e., spectral imaging) of the material. Spectral images of a material piece may also be used in a template-matching algorithm, wherein a database of spectral images is compared against an acquired spectral image to find the presence or absence of certain types of materials from that database. A histogram of the captured spectral image may also be compared against a database of histograms. Similarly, a bag of words model may be used with a feature extraction technique, such as scale-invariant feature transform ("SIFT"), to compare extracted features between a captured spectral image and those in a database.

One point of mention here is that, in accordance with certain embodiments of the present disclosure, the detected/captured features/characteristics (e.g., spectral images) of the material pieces may not be necessarily simply particularly identifiable or discernible physical characteristics; they can be abstract formulations that can only be expressed mathematically, or not mathematically at all; nevertheless, the AI system may be configured to parse the spectral data to look for patterns that allow the control samples to be classified during the training stage. Furthermore, the AI system may take subsections of captured information (e.g., spectral images) of a material piece and attempt to find correlations between the pre-defined classifications.

In accordance with certain embodiments of the present disclosure, instead of utilizing a training stage whereby control (homogenous) samples of material pieces are passed by the vision system and/or sensor system(s), training of the AI system may be performed utilizing a labeling/annotation technique (or any other supervised learning technique) whereby as data/information of material pieces are captured by a vision/sensor system, a user inputs a label or annotation that identifies each material piece, which is then used to create the library for use by the AI system when classifying material pieces within a heterogenous mixture of material pieces. In other words, a previously generated knowledge base of characteristics captured from one or more samples of a class of materials may be accomplished by any of the techniques disclosed herein, whereby such a knowledge base is then utilized to automatically classify materials.

Therefore, as disclosed herein, certain embodiments of the present disclosure provide for the identification/classification of one or more different materials in order to determine which material pieces should be diverted from a conveyor system or device. In accordance with certain embodiments, machine learning techniques may be utilized to train (i.e., configure) a neural network to identify a variety of one or more different classes or types of materials. Images, or other types of sensed information, may be captured of materials (e.g., traveling on a conveyor system), and based on the identification/classification of such materials, the systems described herein can decide which material piece should be allowed to remain on the conveyor system, and which should be diverted/removed from the conveyor system (for example, either into a collection receptacle, or diverted onto another conveyor system).

In accordance with certain embodiments of the present disclosure, any sensed characteristics output by any of the sensor systems 120 disclosed herein may be input into an AI system in order to classify and/or sort materials. For example, in an AI system implementing supervised learning, sensor system 120 outputs that uniquely characterize a particular type or composition of material may be used to train the AI system.

Figure 3:
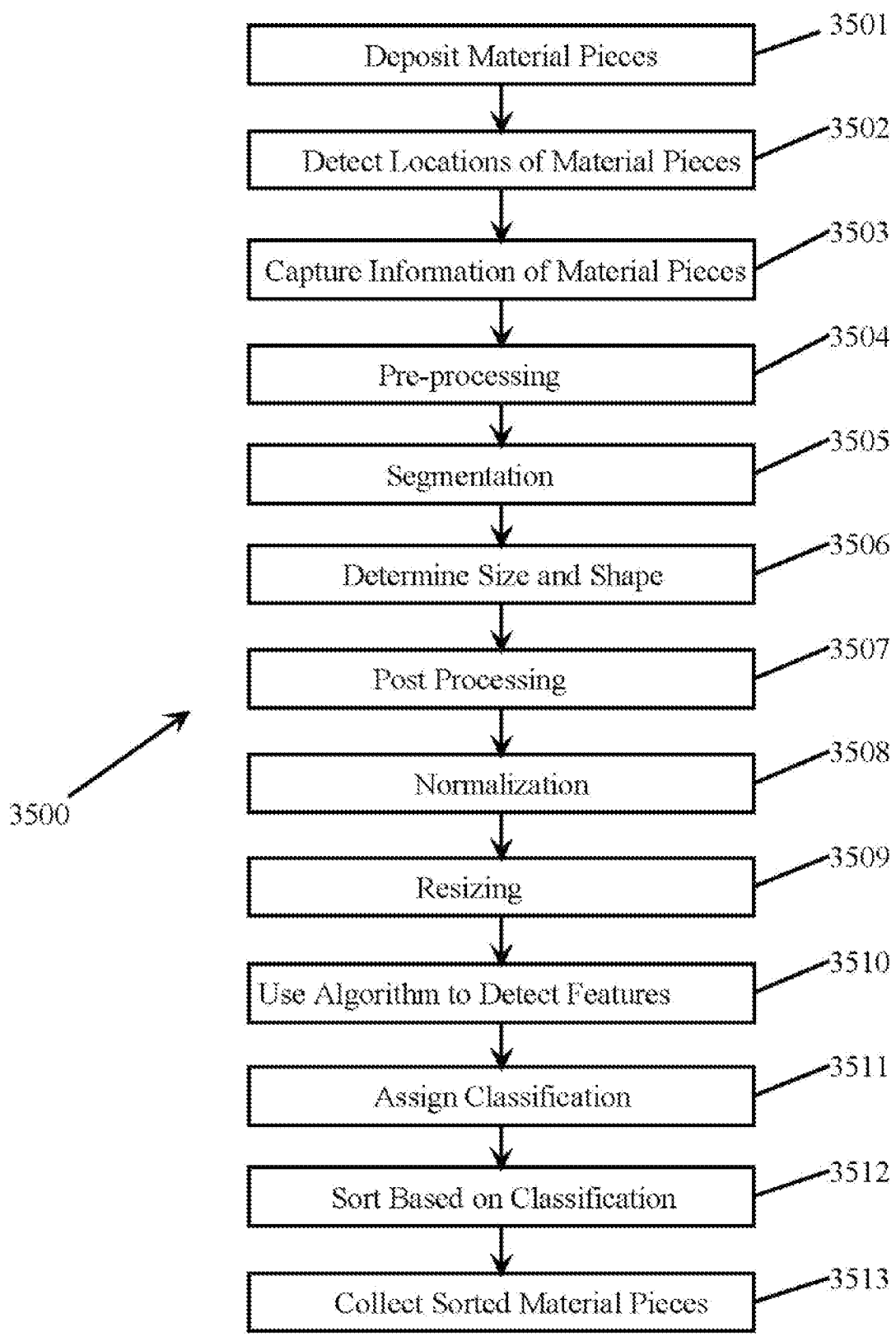
FIG. 3 illustrates a flowchart diagram configured in accordance with embodiments of the present disclosure.

FIG. 3 illustrates a flowchart diagram depicting exemplary embodiments of a process 3500 of classifying/sorting material pieces utilizing a vision system and/or one or more sensor systems in accordance with certain embodiments of the present disclosure. The process 3500 may be performed to classify a heterogeneous mixture of material pieces into any combination of predetermined types, classes, and/or fractions. The process 3500 may be configured to operate within any of the embodiments of the present disclosure described herein, including the material handling system 100 of FIG. 1. Note that not all of the process blocks may be necessarily implemented depending upon the particular classification technique utilized. Operation of the process 3500 may be performed by hardware and/or software, including within a computer system (e.g., data processing system 3400 of FIG. 5) controlling the system (e.g., the computer system 107, the vision system 110, and/or the sensor system(s) 120 of FIG. 1). In the process block 3501, the material pieces may be deposited onto a conveyor system. In the process block 3502, the location on the conveyor system of each material piece is detected for tracking of each material piece as it travels through the material handling system 100. This may be performed by the vision system 110 (for example, by distinguishing a material piece from the underlying conveyor system material while in communication with a conveyor system position detector (e.g., the position detector 105)). Alternatively, a material piece tracking device 111 can be used to track the pieces. Or, any system that can create a light source (including, but not limited to, visual light, UV, and IR) and have a detector that can be used to locate the pieces. In the process block 3503, when a material piece has traveled in proximity to one or more of the vision system and/or the sensor system(s), sensed information/characteristics of the material piece is captured/acquired. In the process block 3504, a vision system (e.g., implemented within the computer system 107), such as previously disclosed, may perform pre-processing of the captured information, which may be utilized to detect (extract) information of each of the material pieces (e.g., from the background (e.g., the conveyor belt); in other words, the pre-processing may be utilized to identify the difference between the material piece and the background). Well-known image processing techniques such as dilation, thresholding, and contouring may be utilized to identify the material piece as being distinct from the background. In the process block 3505, segmentation may be performed. For example, the captured information may include information pertaining to one or more material pieces. Additionally, a particular material piece may be located on a seam of the conveyor belt when its image is captured. Therefore, it may be desired in such instances to isolate the image of an individual material piece from the background of the image. In an exemplary technique for the process block 3505, a first step is to apply a high contrast of the image; in this fashion, background pixels are reduced to substantially all black pixels, and at least some of the pixels pertaining to the material piece are brightened to substantially all white pixels. The image pixels of the material piece that are white are then dilated to cover the entire size of the material piece. After this step, the location of the material piece is a high contrast image of all white pixels on a black background. Then, a contouring algorithm can be utilized to detect boundaries of the material piece. The boundary information is saved, and the boundary locations are then transferred to the original image. Segmentation is then performed on the original image on an area greater than the boundary that was earlier defined. In this fashion, the material piece is identified and separated from the background.

In the optional process block 3506, the material pieces may be conveyed along the conveyor system within proximity of a material piece tracking device and/or a sensor system in order to track each of the material pieces and/or determine a size and/or shape of the material pieces, which may be useful if an XRF system or some other spectroscopy sensor is also implemented within the sorting system. In the process block 3507, post processing may be performed. Post processing may involve resizing the captured information/data to prepare it for use in the neural networks. This may also include modifying certain properties (e.g., enhancing image contrast, changing the image background, or applying filters) in a manner that will yield an enhancement to the capability of the AI system to classify the material pieces. In the process block 3509, the data may be resized. Data resizing may be desired under certain circumstances to match the data input requirements for certain AI systems, such as neural networks. For example, neural networks may require much smaller image sizes (e.g., 225×255 pixels or 299×299 pixels) than the sizes of the images captured by typical digital cameras. Moreover, the smaller the input data size, the less processing time is needed to perform the classification. Thus, smaller data sizes can ultimately increase the throughput of the material handling system 100 and increase its value.

In the process blocks 3510 and 3511, each material piece is identified/classified based on the sensed/detected features. For example, the process block 3510 may be configured with a neural network employing one or more algorithms, which compare the extracted features with those stored in a previously generated knowledge base (e.g., generated during a training stage), and assigns the classification with the highest match to each of the material pieces based on such a comparison. The algorithms may process the captured information/data in a hierarchical manner by using automatically trained filters. The filter responses are then successfully combined in the next levels of the algorithms until a probability is obtained in the final step. In the process block 3511, these probabilities may be used for each of the N classifications to decide into which of the N sorting receptacles the respective material pieces should be sorted. For example, each of the N classifications may be assigned to one sorting receptacle, and the material piece under consideration is sorted into that receptacle that corresponds to the classification returning the highest probability larger than a predefined threshold. Within embodiments of the present disclosure, such predefined thresholds may be preset by the user. A particular material piece may be sorted into an outlier receptacle (e.g., sorting receptacle 140) if none of the probabilities is larger than the predetermined threshold.

Next, in the process block 3512, a sorting device corresponding to the classification, or classifications, of the material piece is activated (e.g., instructions sent to the sorting device to sort). Between the time at which the image of the material piece was captured and the time at which the sorting device is activated, the material piece has moved from the proximity of the vision system and/or sensor system(s) to a location downstream on the conveyor system (e.g., at the rate of conveying of a conveyor system). In embodiments of the present disclosure, the activation of the sorting device is timed such that as the material piece passes the sorting device mapped to the classification of the material piece, the sorting device is activated, and the material piece is diverted/ejected from the conveyor system into its associated sorting receptacle. Within embodiments of the present disclosure, the activation of a sorting device may be timed by a respective position detector that detects when a material piece is passing before the sorting device and sends a signal to enable the activation of the sorting device. In the process block 3513, the sorting receptacle corresponding to the sorting device that was activated receives the diverted/ejected material piece.

Figure 4:
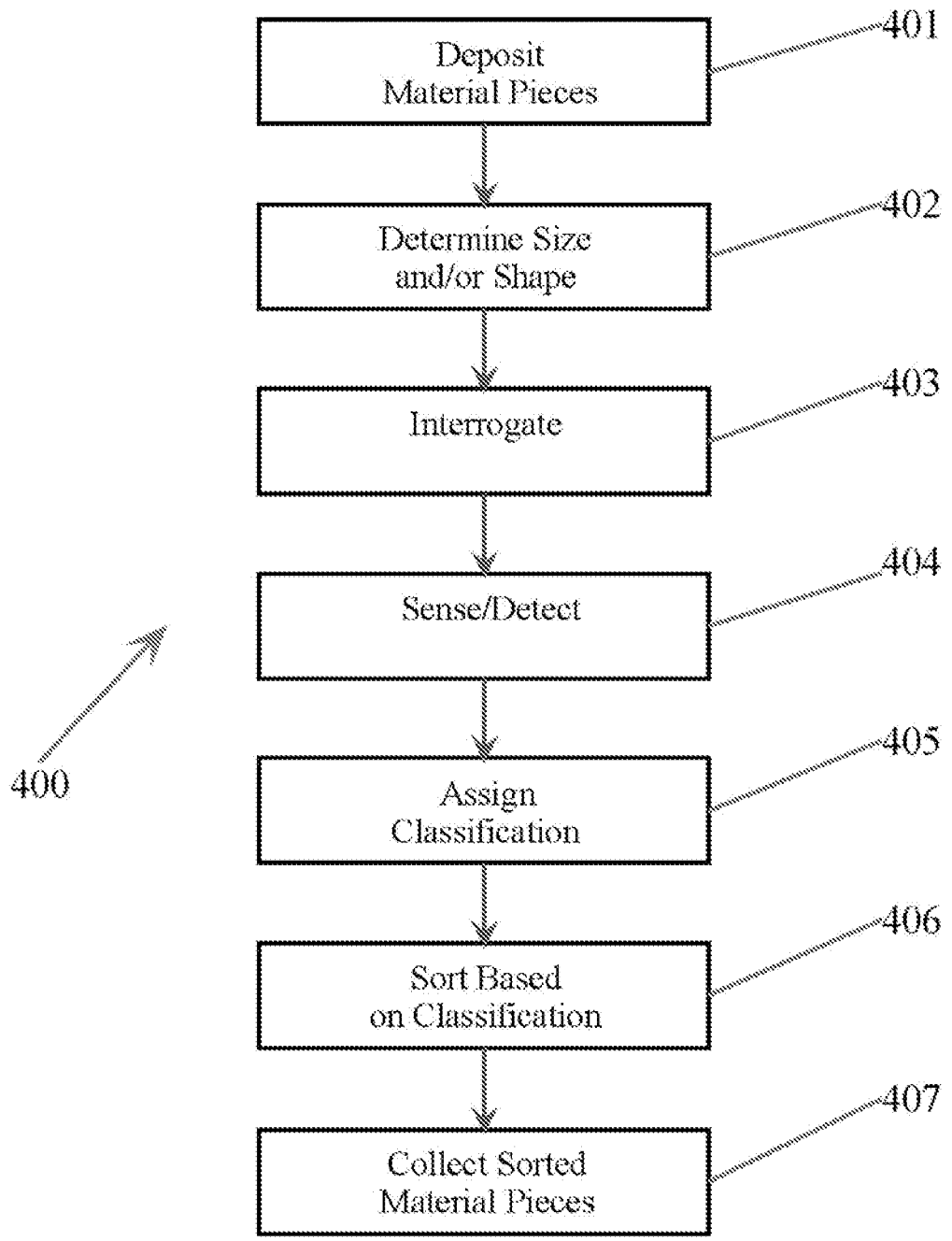
FIG. 4 illustrates a flowchart diagram configured in accordance with embodiments of the present disclosure.

FIG. 4 illustrates a flowchart diagram depicting exemplary embodiments of a process 400 configured in accordance with certain embodiments of the present disclosure. The process 400 may be configured to operate within any of the embodiments of the present disclosure described herein, including the material handling system 100 of FIG. 1. The process 400 may be configured to operate in conjunction with the process 3500. For example, in accordance with certain embodiments of the present disclosure, the process blocks 403 and 404 may be incorporated in the process 3500 (e.g., operating in series or in parallel with the process blocks 3503-3510) in order to combine the efforts of a vision system 110 that is implemented in conjunction with an AI system with a sensor system (e.g., the sensor system 120) that is not implemented in conjunction with an AI system in order to classify and/or sort material pieces.

Operation of the process 400 may be performed by hardware and/or software, including within a computer system (e.g., data processing system 3400 of FIG. 5) controlling the system (e.g., the computer system 107 of FIG. 1). In the process block 401, the material pieces may be deposited onto a conveyor system. Next, in the optional process block 402, the material pieces may be conveyed along the conveyor system within proximity of a material piece tracking device and/or an optical imaging system in order to track each material piece and/or determine a size and/or shape of the material pieces. In the process block 403, when a material piece has traveled in proximity of the sensor system, the material piece may be interrogated, or stimulated, with EM energy (waves) or some other type of stimulus appropriate for the particular type of sensor technology utilized by the sensor system (e.g., an XRF system as described herein). In the process block 404, physical characteristics of the material piece are sensed/detected and captured by the sensor system. In the process block 405, for at least some of the material pieces, the type of material is identified/classified based (at least in part) on the captured characteristics (e.g., an XRF spectrum).

Next, if sorting of the material pieces is to be performed, in the process block 406, a sorting device corresponding to the classification, or classifications, of the material piece is activated. Between the time at which the material piece was sensed and the time at which the sorting device is activated, the material piece has moved from the proximity of the sensor system to a location downstream on the conveyor system, at the rate of conveying of the conveyor system. In certain embodiments of the present disclosure, the activation of the sorting device is timed such that as the material piece passes the sorting device mapped to the classification of the material piece, the sorting device is activated, and the material piece is diverted/ejected from the conveyor system into its associated sorting receptacle. Within certain embodiments of the present disclosure, the activation of a sorting device may be timed by a respective position detector that detects when a material piece is passing before the sorting device and sends a signal to enable the activation of the sorting device. In the process block 407, the sorting receptacle corresponding to the sorting device that was activated receives the diverted/ejected material piece.

Figure 5:
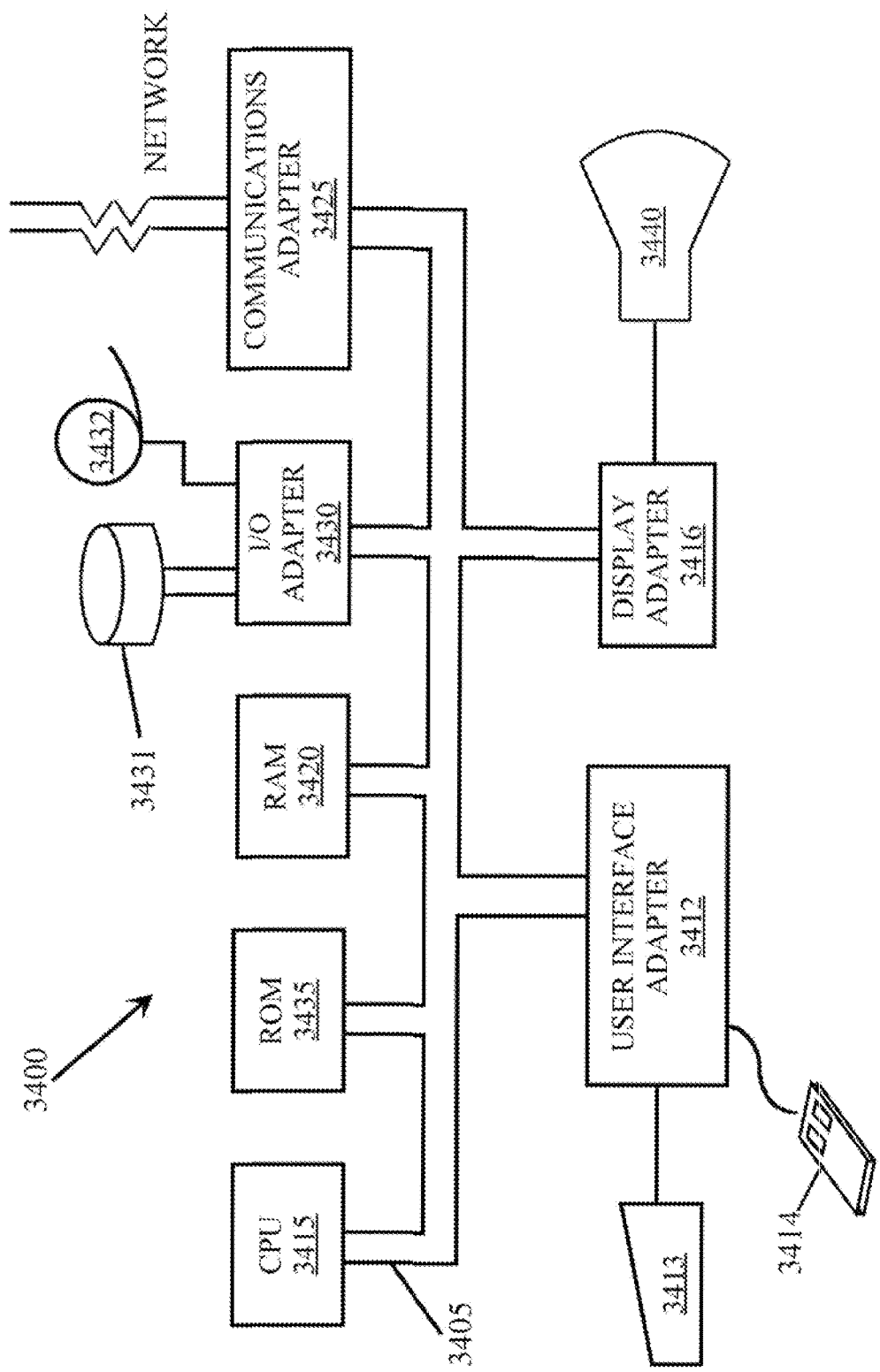
FIG. 5 illustrates a block diagram of a data processing system configured in accordance with embodiments of the present disclosure.

With reference now to FIG. 5, a block diagram illustrating a data processing ("computer") system 3400 is depicted in which aspects of embodiments of the present disclosure may be implemented. (The terms "computer," "system," "computer system," and "data processing system" may be used interchangeably herein.) The computer system 107, the automation control system 108, aspects of the sensor system(s) 120, and/or the vision system 110 may be configured similarly as the data processing system 3400. The data processing system 3400 may employ a local bus 3405 (e.g., a peripheral component interconnect ("PCI") local bus architecture). Any suitable bus architecture may be utilized such as Accelerated Graphics Port ("AGP") and Industry Standard Architecture ("ISA"), among others. One or more processors 3415, volatile memory 3420, and non-volatile memory 3435 may be connected to the local bus 3405 (e.g., through a PCI Bridge (not shown)). An integrated memory controller and cache memory may be coupled to the one or more processors 3415. The one or more processors 3415 may include one or more central processor units and/or one or more graphics processor units and/or one or more tensor processing units. Additional connections to the local bus 3405 may be made through direct component interconnection or through add-in boards. In the depicted example, a communication (e.g., network (LAN)) adapter 3425, an I/O (e.g., small computer system interface ("SCSI") host bus) adapter 3430, and expansion bus interface (not shown) may be connected to the local bus 3405 by direct component connection. An audio adapter (not shown), a graphics adapter (not shown), and display adapter 3416 (coupled to a display 3440) may be connected to the local bus 3405 (e.g., by add-in boards inserted into expansion slots).

The user interface adapter 3412 may provide a connection for a keyboard 3413 and a mouse 3414, modem (not shown), and additional memory (not shown). The I/O adapter 3430 may provide a connection for a hard disk drive 3431, a tape drive 3432, and a CD-ROM drive (not shown).

An operating system may be run on the one or more processors 3415 and used to coordinate and provide control of various components within the data processing system 3400. In FIG. 5, the operating system may be a commercially available operating system. An object-oriented programming system (e.g., Java, Python, etc.) may run in conjunction with the operating system and provide calls to the operating system from programs or programs (e.g., Java, Python, etc.) executing on the data processing system 3400. Instructions for the operating system, the object-oriented operating system, and programs may be located on non-volatile memory 3435 storage devices, such as a hard disk drive 3431, and may be loaded into volatile memory 3420 for execution by the processor 3415.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5. Also, any of the processes of the present disclosure may be applied to a multiprocessor computer system, or performed by a plurality of such data processing systems 3400. For example, training of the vision system 110 may be performed by a first data processing system 3400, while operation of the vision system 110 for sorting may be performed by a second data processing system 3400.

As another example, the data processing system 3400 may be a stand-alone system configured to be bootable without relying on some type of network communication interface, whether or not the data processing system 3400 includes some type of network communication interface. As a further example, the data processing system 3400 may be an embedded controller, which is configured with ROM and/or flash ROM providing non-volatile memory storing operating system files or user-generated data.

The depicted example in FIG. 5 and above-described examples are not meant to imply architectural limitations. Further, a computer program form of aspects of the present disclosure may reside on any computer readable storage medium (i.e., floppy disk, compact disk, hard disk, tape, ROM, RAM, etc.) used by a computer system.

Figure 6:
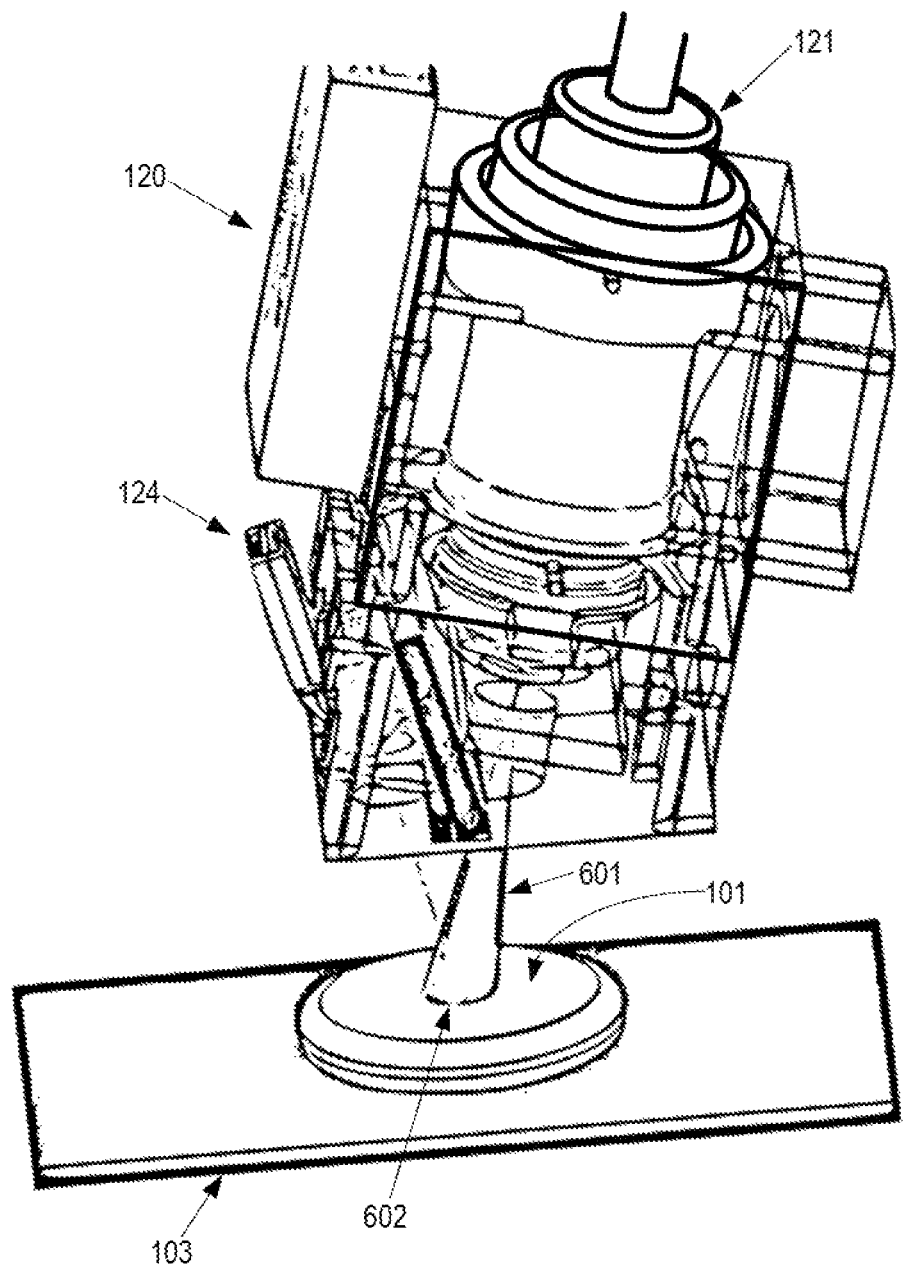
FIG. 6 illustrates an XRF system.

FIG. 6 illustrates a simplified diagram of an example of an XRF system 120 composed of an x-ray tube 121 and a corresponding XRF detector 124. As a material piece 101 is conveyed by a conveyor belt 103, it is irradiated by an x-ray beam 601. The irradiated x-ray beam 601 typically will have the form of a cone resulting in an x-ray beam spot 602 contacting the material piece 101, and thus having a corresponding diameter. It is desired for operation of an XRF system that the x-ray beam spot 602 only irradiates at least some portion of the material piece 101, and does not irradiate any other material piece or any portion of the conveyor belt 103 at the time that the resulting x-ray florescence is being detected by the detector 124, which is needed to produce an accurate XRF spectrum of the material piece 101 in order to accurately classify the material piece 101. The problem is that it can relatively often occur within a material handling system 100 that the x-ray beam spot 602 does not fall completely on any portion of a material piece 101 as it is being conveyed past the XRF system 120.

Figure 7:
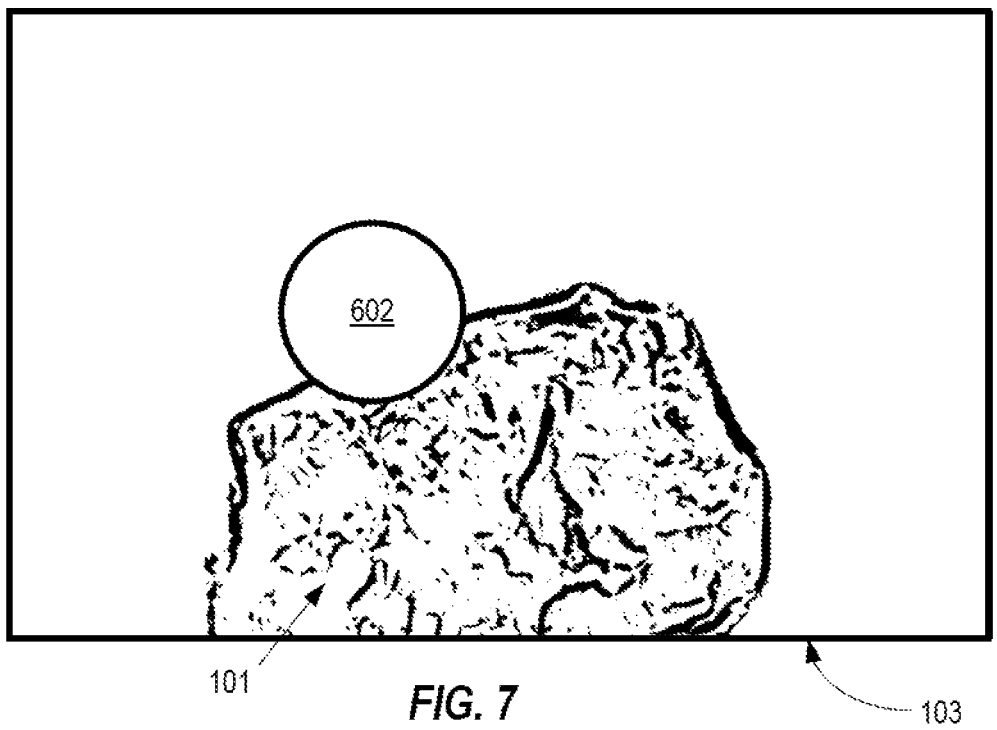
FIG. 7 illustrates an example of misalignment of an x-ray beam spot and a material piece.

Referring to FIG. 7, there is illustrated an example of an instance where there is not a proper alignment or positioning of the material piece 101 on the conveyor belt 103 relative to the XRF system 120 so that the x-ray beam spot 602 only irradiates a portion of the material piece 101. In other words, the x-ray beam spot 602 does not completely intersect with the conveyed material piece 101. For example, the material handling system 100 may have resulted in the positioning of the material piece 101 misaligned or only partially aligned with the x-ray beam spot 602.

Referring to FIG. 8, there is illustrated an exemplary singulator 106 demonstrating how material pieces 101 that are fed onto a conveyor system 103 are supposed to be aligned with the XRF system so that the x-ray beam 601 properly irradiates each of the material pieces 101. The example of FIG. 8 schematically shows how one or more static alignment rods or bars (also sometimes referred to as "fingers") 810 . . . 817 may be configured to align the individual material pieces 101 into one or more singulated streams on a conveyor belt so that they travel directly beneath the x-ray emitter 121 so that the x-ray beam spot 602 fully lands upon each material piece 101. Though the example of FIG. 8 is not limiting, it does illustrate how the material pieces 101 can be singulated into separate singulated streams 802 . . . 805 (in this nonlimiting example, four singulated streams) of material pieces 101 on a conveyor belt 103. Within embodiments of the present disclosure, a single conveyor belt may transport such a plurality of singulated streams, or a plurality of individually driven conveyor belts may be utilized whereby each of the conveyor belts conveys one or more of the separate singulated streams (e.g., 802 . . . 805) of material pieces 101.

Referring again to FIG. 7, if such a material piece 101 is not positioned or fed onto the conveyor belt 103 in proper alignment with the downstream XRF system 120, then the x-ray beam spot 602 may irradiate none of or only a portion of that material piece 101, which can result in the capturing of an XRF spectrum that includes all or a portion of the underlying conveyor belt material, which can lead to an incorrect classification (and sorting if implemented) of the material piece 101.

Figure 9:
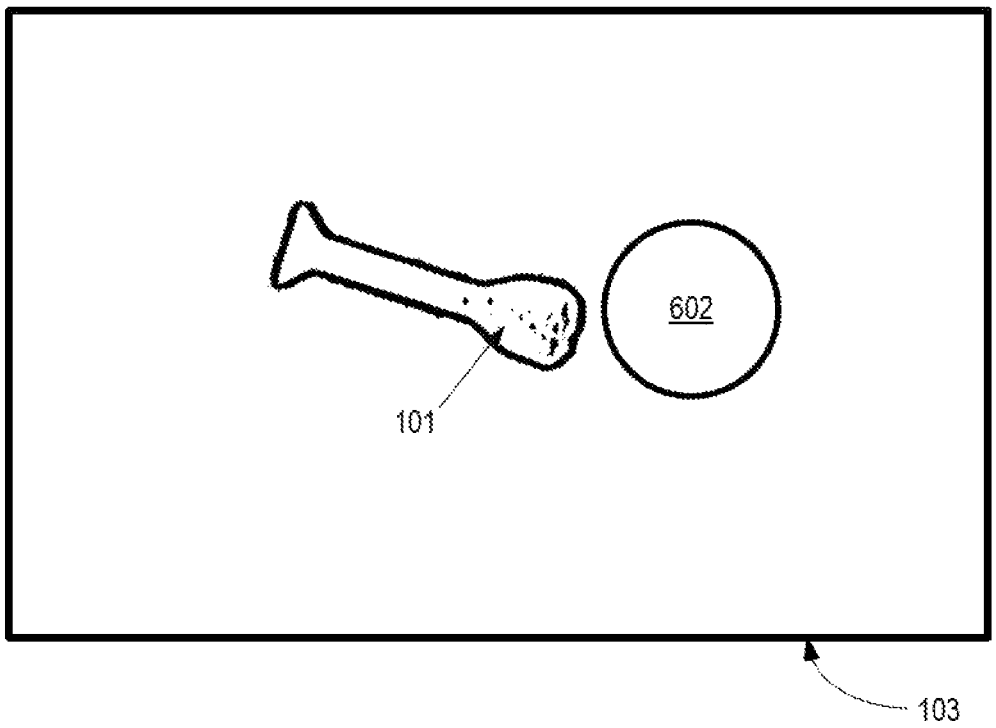
FIG. 9 illustrates an example of misalignment of an x-ray beam spot and a thin strip material piece.

FIG. 9 illustrates an example of another potential problem whereby the dimensions (e.g., cross-section) of a particular material piece 101 are narrower than the diameter of the x-ray beam spot 602, such as in the instance of a material piece 101 that has an elongated shape (also referred to herein as a thin strip, or a material piece having a thin strip shape form). Again, in such an instance, the captured XRF spectrum will include measurements of x-ray fluorescence of elements within the underlying conveyor belt 103 on which the material piece 101 is travelling.

Figure 11:
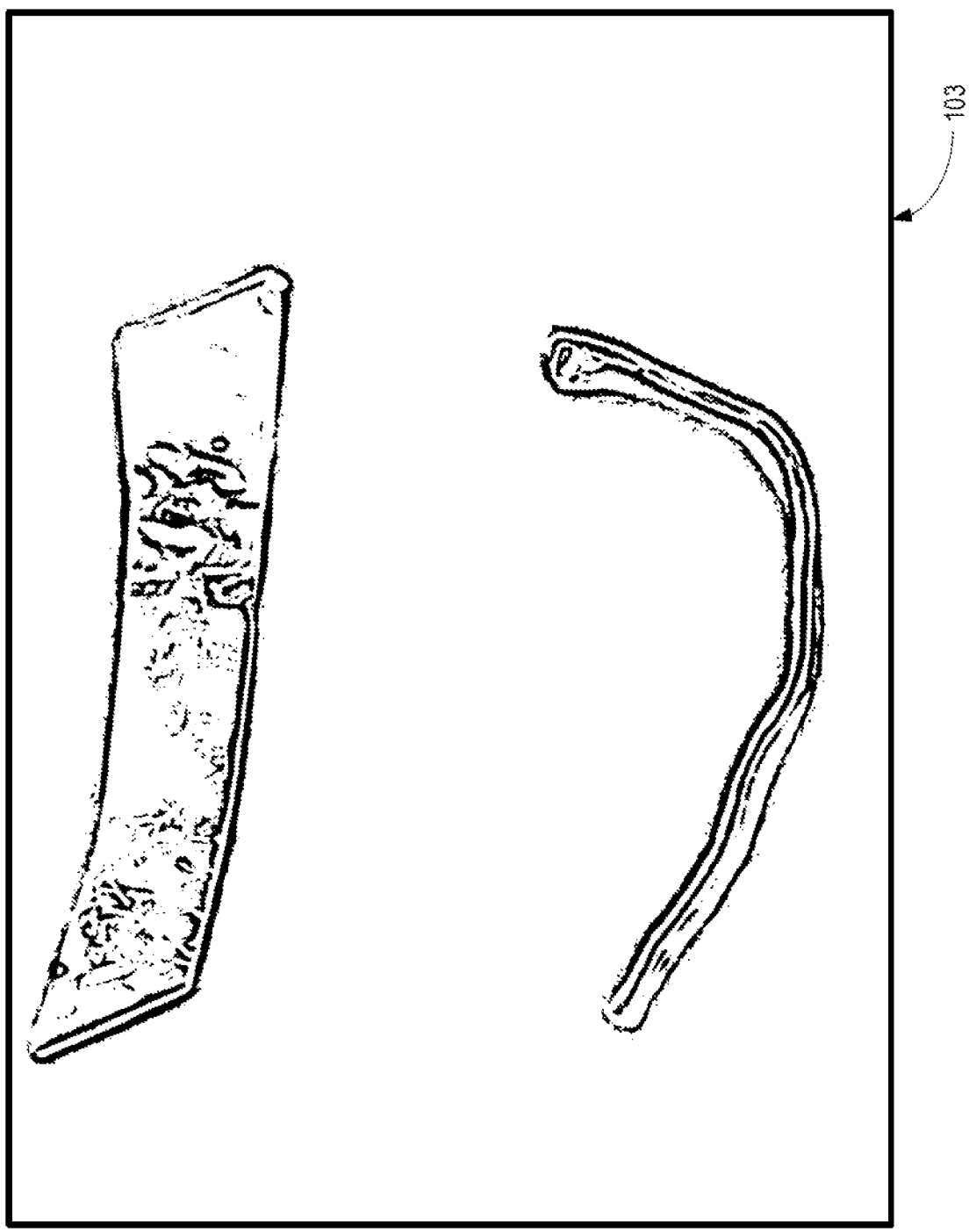
FIG. 11 illustrates exemplary thin strip material pieces.

As used herein, a material piece having a thin strip shape or form is any material piece having a cross-sectional dimension that is less than the diameter of the x-ray beam spot 602 utilized within a system for classifying material pieces utilizing x-ray fluorescence (e.g., the material handling system 100). For example, if the effective x-ray beam spot that contacts material pieces within such a system has a diameter of two inches, then a thin strip material piece will be any material piece having a cross-sectional dimension less than two inches. Likewise, if the effective x-ray beam spot within such a system has a diameter of two millimeters, then a thin strip material piece will be any material piece having a cross-sectional dimension less than two millimeters, and so on. It is known in the automotive industry that shredded pieces of Clip having an elongated shape or form (i.e., thin strips) often are composed of a high copper aluminum alloy (e.g., 6xx3). As shown in FIGS. 9 and 11, such thin strips generally have a length that is substantially greater than the width (e.g., length is three or more times the dimension of the width).

Figure 10A:
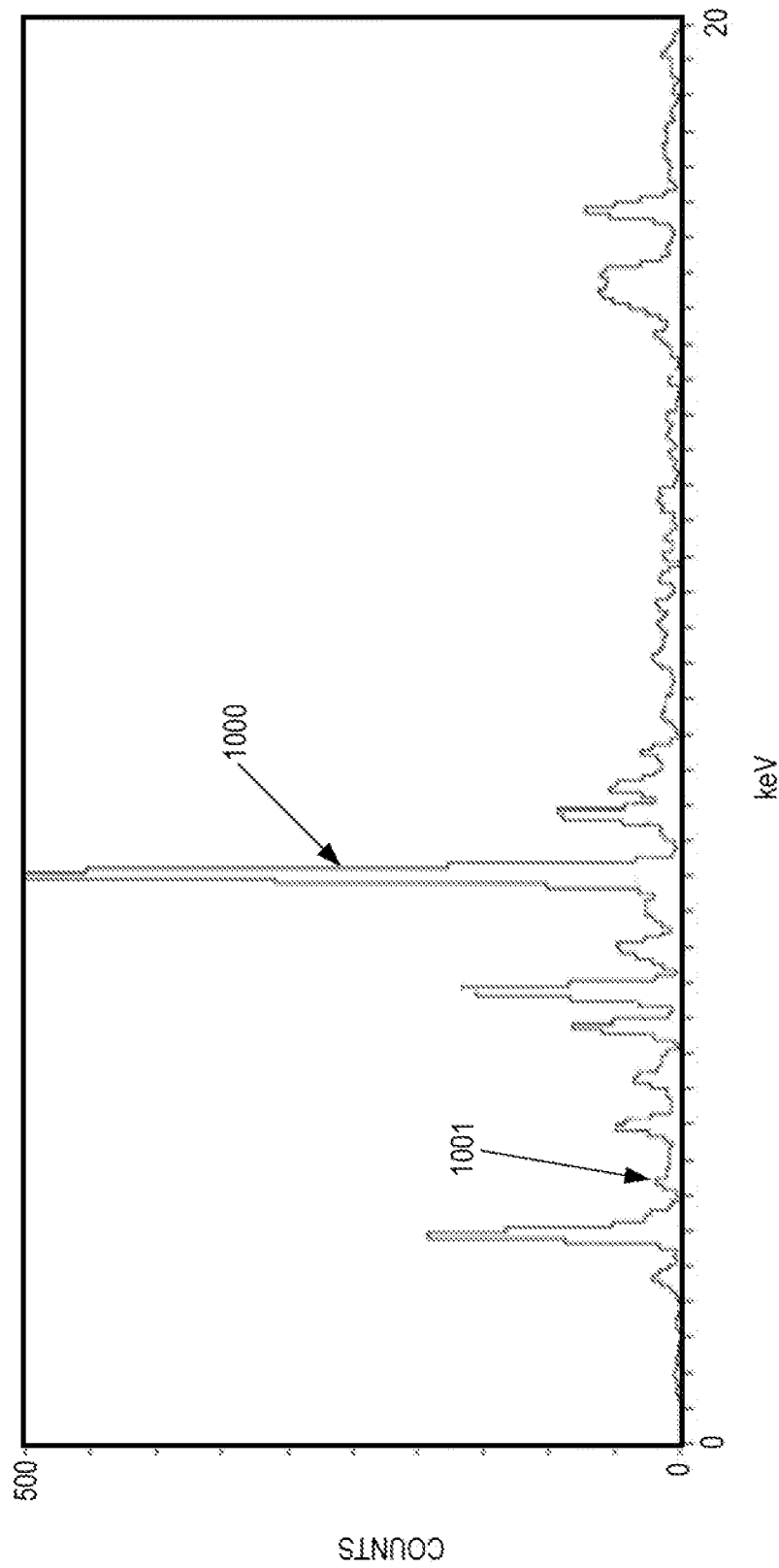
FIGS. 10A, 10B, 10C and 10D illustrate exemplary XRF spectra demonstrating how an erroneous XRF reading or measurement can result from an improper alignment or intersection of an x-ray beam spot and a material piece.
Figure 10B:
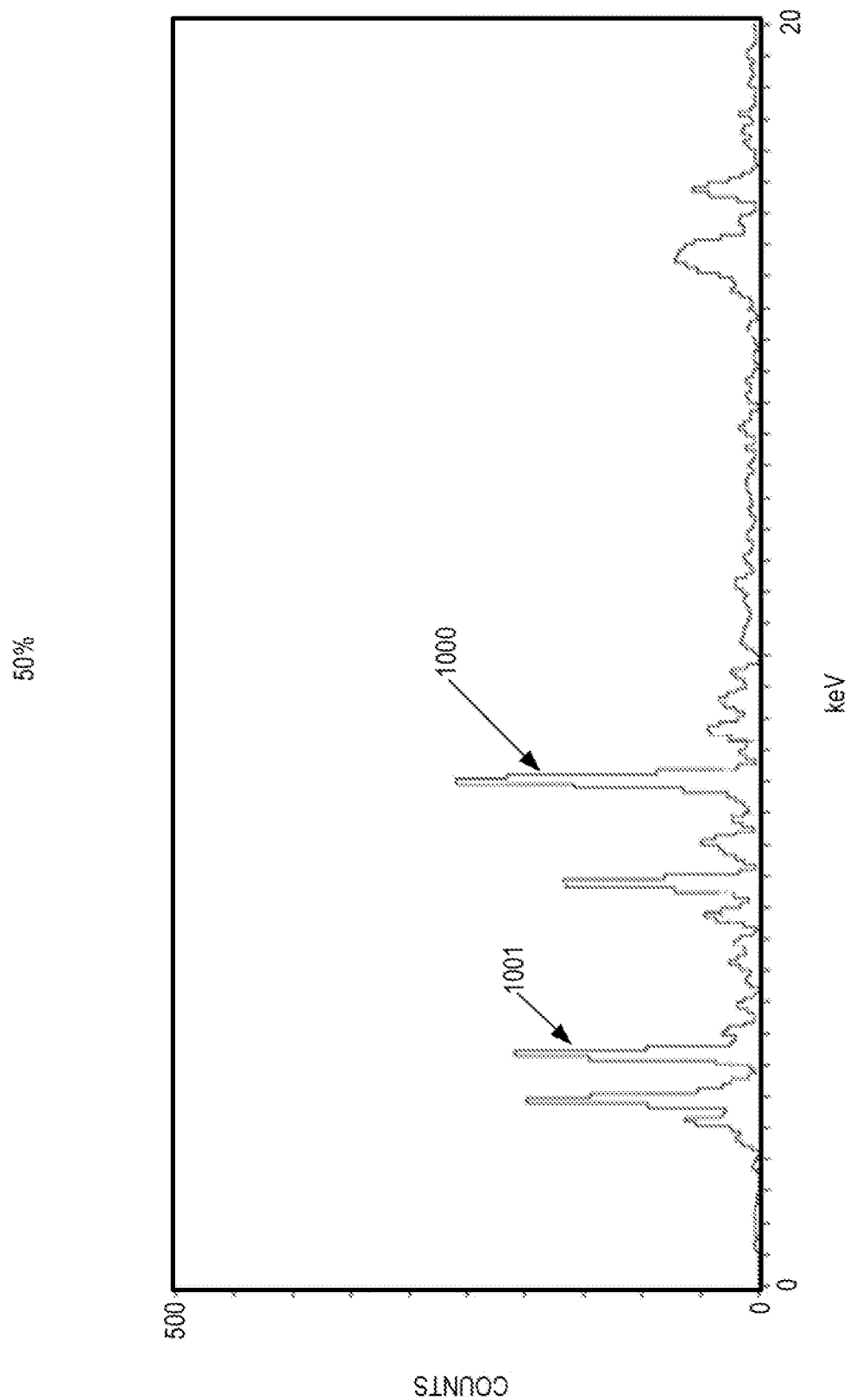
Figure 10C:
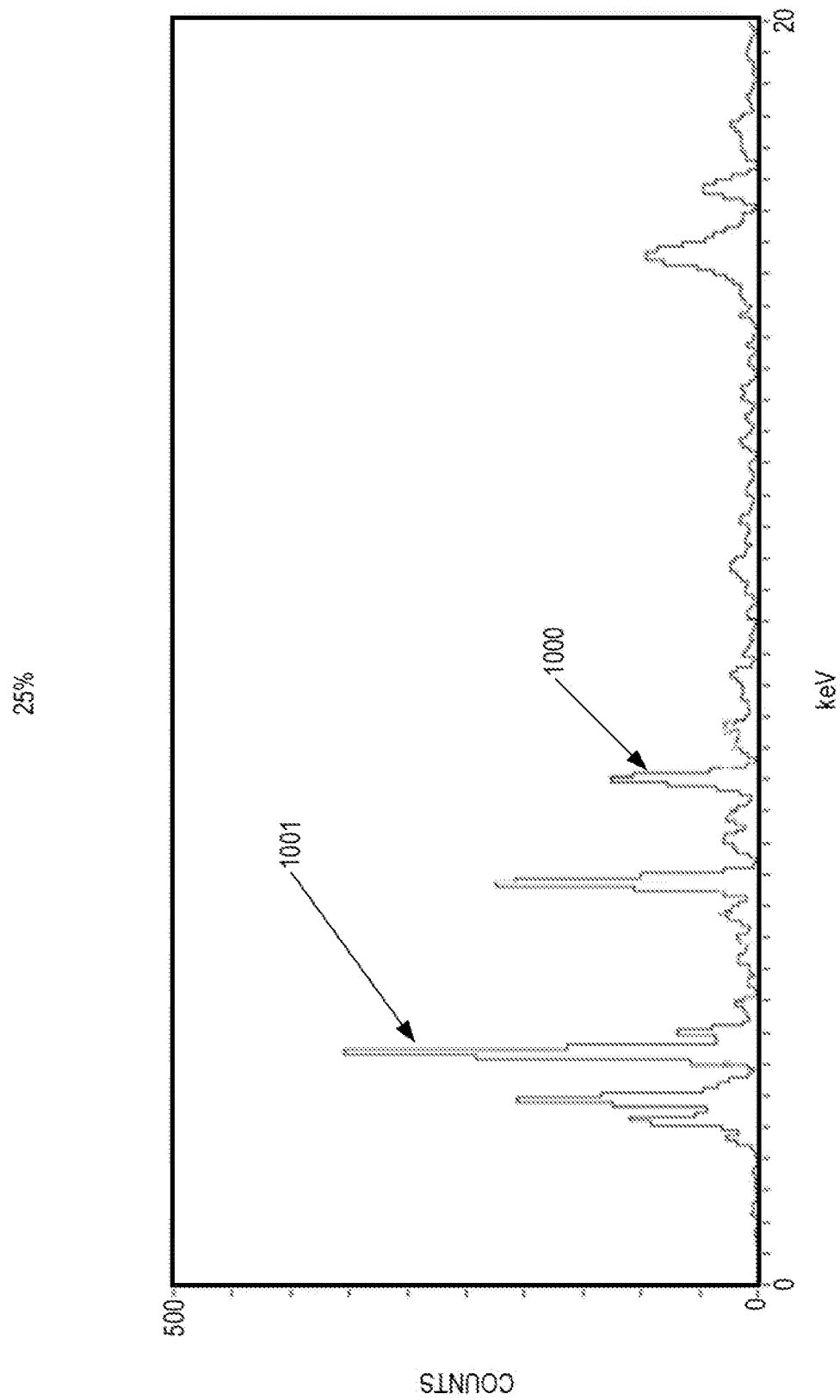
Figure 10D:
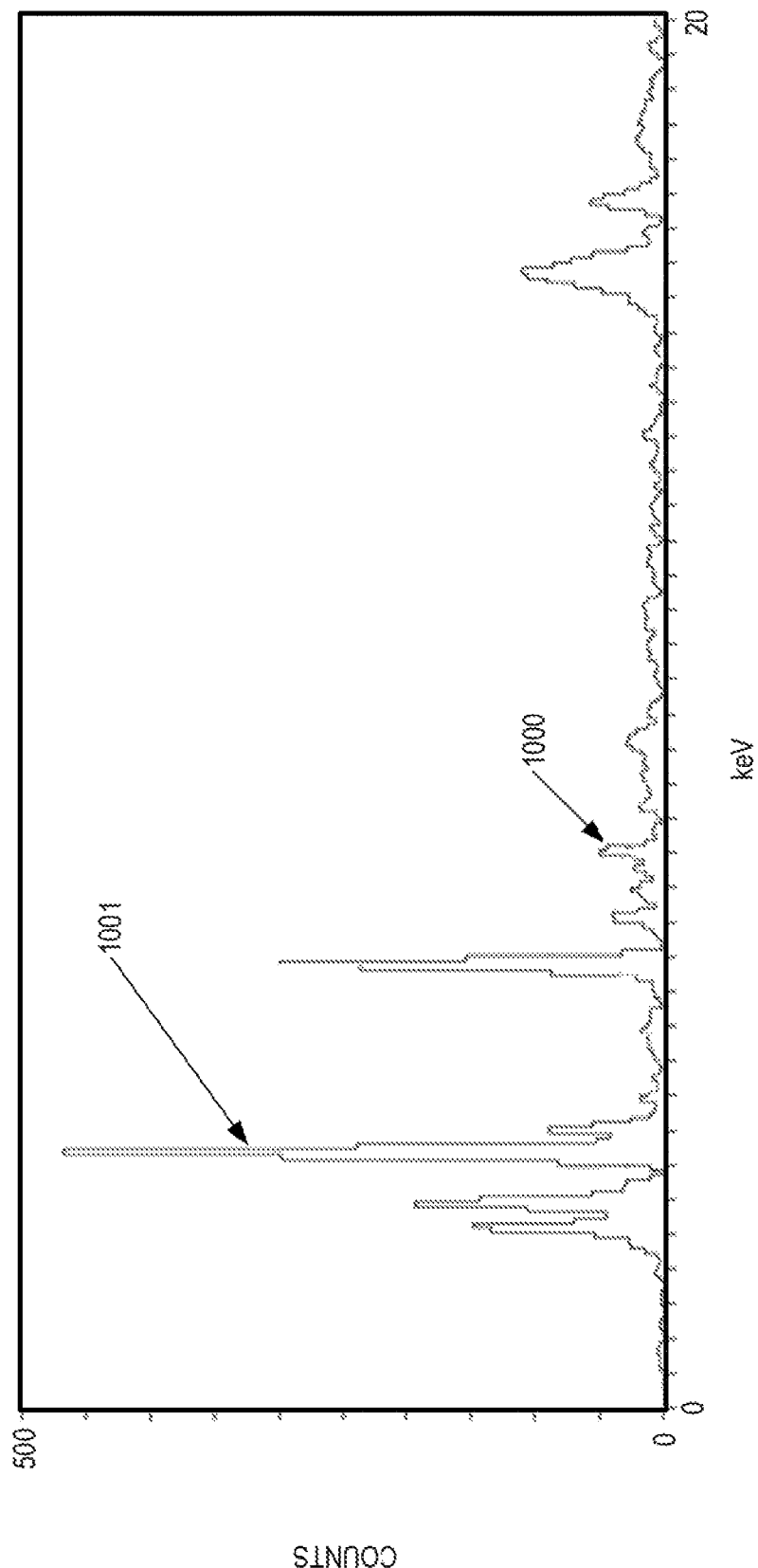

FIGS. 10A-10D illustrate exemplary XRF spectra demonstrating how such an erroneous XRF reading or measurement can result from an improper alignment or intersection of the x-ray beam spot 602 and a material piece 101. FIG. 10A illustrates an exemplary XRF spectrum captured when the x-ray beam spot 602 completely irradiates at least a portion of the material piece 101 (i.e., there is a 100% intersection between the x-ray beam spot 602 and at least a portion of the material piece 101). FIG. 10B illustrates an exemplary XRF spectrum captured when there is a 50% intersection of the x-ray beam spot 602 and the material piece 101. FIG. 10C illustrates an exemplary XRF spectrum captured when there is a 25% intersection of the x-ray beam spot 602 and the material piece 101. And FIG. 10D illustrates an exemplary XRF spectrum captured when the x-ray beam spot 602 does not irradiate any portion of the material piece 101, and thus completely reads or measures the XRF spectrum emitted from the underlying conveyor belt 103. In each of these XRF spectra, the peaks of two elements are highlighted to demonstrate how this problem can result in an erroneous XRF reading or measurement. The peaks labeled as 1000 represent the XRF measurement of an element that is known to be contained within the material piece (e.g., copper (Cu) within a specific aluminum alloy), and which is known to not be contained (or at least within a lower (e.g., significantly lower) quantity) within the materials that make up the conveyor belt 103. The peaks labeled as 1001 represent an element that is known to be contained within the conveyor belt material 103, and which is also known to not be contained (or at least within a lower (e.g., significantly lower) quantity) within the material pieces being classified (e.g., titanium (Ti), zinc (Zn), or nickel (Ni)). As can be readily seen, the peak 1000 decreases and the peak 1001 increases in proportion to the percentage intersection between the x-ray beam spot 602 and the material piece 101.

A non-limiting example of the foregoing problem, and in particular as previously described with respect to FIG. 9, is the classification and sorting of aluminum alloys. When various wrought, or sheet, aluminum alloys are utilized in the manufacture of certain end use devices (for example, as body parts in a vehicle (e.g., the Ford F-150)), the unused aluminum alloy material within a stamping process (often referred to in the industry as "Clip"), which is composed of the different wrought aluminum alloys, may be commingled and shredded resulting in a heterogeneous mixture of shredded aluminum alloy pieces that include those having an elongated or thin strip shape or form.

As illustrated in FIG. 11, when such thin strip material pieces are deposited onto a conveyor belt 103 for classification and sorting, they can end up being positioned on the conveyor belt 103 in various orientations, many of which can result in the problem previously described with respect to FIG. 9 whereby the x-ray beam spot 602 does not fall completely on such thin strip strips, i.e., less than a 100% intersection between the x-ray beam spot 602 and the material piece 101 (thus, also irradiating a portion of the underlying conveyor belt, resulting in an XRF measurement by the XRF detectors of elements within the conveyor belt). Moreover, when such thin strips are known to have a relatively high copper content (e.g., >0.2%) (and thus belonging to the 6xx3 family of aluminum alloys), and there is an incomplete intersection (e.g., <100%) of the x-ray beam spot 602 and the thin strip, the XRF measurement of the copper content in the thin strip is inaccurate, and can even be low enough so that the thin strip material piece with the high copper content is classified as a different aluminum alloy (e.g., an aluminum alloy with a lower copper content (e.g., <0.2%) associated with a different aluminum alloy such as a 6xx2 or 5xx3 aluminum alloy).

Figure 12:
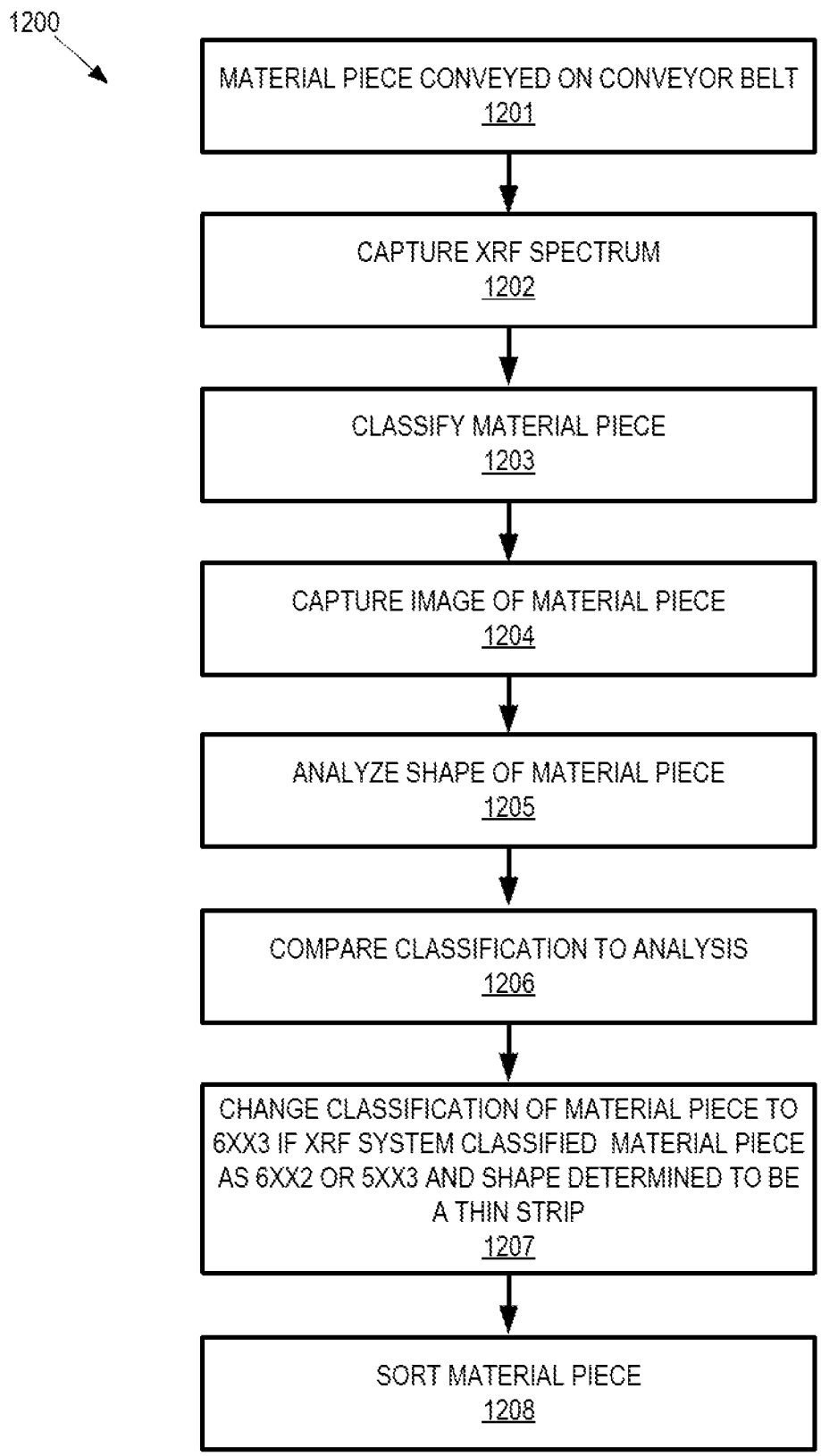
FIG. 12 illustrates a flowchart diagram configured in accordance with embodiments of the present disclosure.

FIG. 12 illustrates a system and process 1200 configured to correct for the aforementioned beam intersection problem in accordance with certain embodiments of the present disclosure. Each material piece 101 may be conveyed 1201 by a conveyor system 103 (e.g., travelling on a conveyor belt). An XRF spectrum is then captured 1202 of the material piece 101 by an XRF system 120, and used to classify/identify 1203 the material piece 101. An image of the material piece 101 is then captured 1204 by the vision system 110, and the shape of the material piece 101 is analyzed 1205 (e.g., such as using image processing of the image data packet within LabVIEW). The result of the analysis of the image is compared 1206 with the XRF spectrum classification/identification, and if the XRF system classifies/identifies the material piece 101 as a belonging to one of the 6xx2 or 5xx3 aluminum alloys, and the vision system classified/identified the material piece 101 as a thin strip from the analysis of the image data, then the classification/identification of the material piece 101 may be changed 1207 (or, the classification is replaced with a new classification) to the aluminum alloy 6xx3. In such a manner, thin strips (thin strip material pieces) composed of a high copper content aluminum alloy are reclassified/identified as belonging to the aluminum alloy 6xx3 (e.g., 6013 or 6113 aluminum alloys) even though the XRF system classified them as belonging within a low copper content aluminum alloy (e.g., 5xx3, 6xx2, such as 5083, 6062, or 6262 aluminum alloys) because of the lack of a 100% intersection between the material piece 101 and the x-ray beam spot. Thereafter, the material piece 101 may be sorted 1208 according to the changed classification/identification.

In accordance with alternative embodiments of the present disclosure, capturing of any other information associated with the material piece may be made by some other type of sensor system(s) as described herein and process in accordance with the system and process 1200 instead of utilization of an XRF system.

Figure 13:
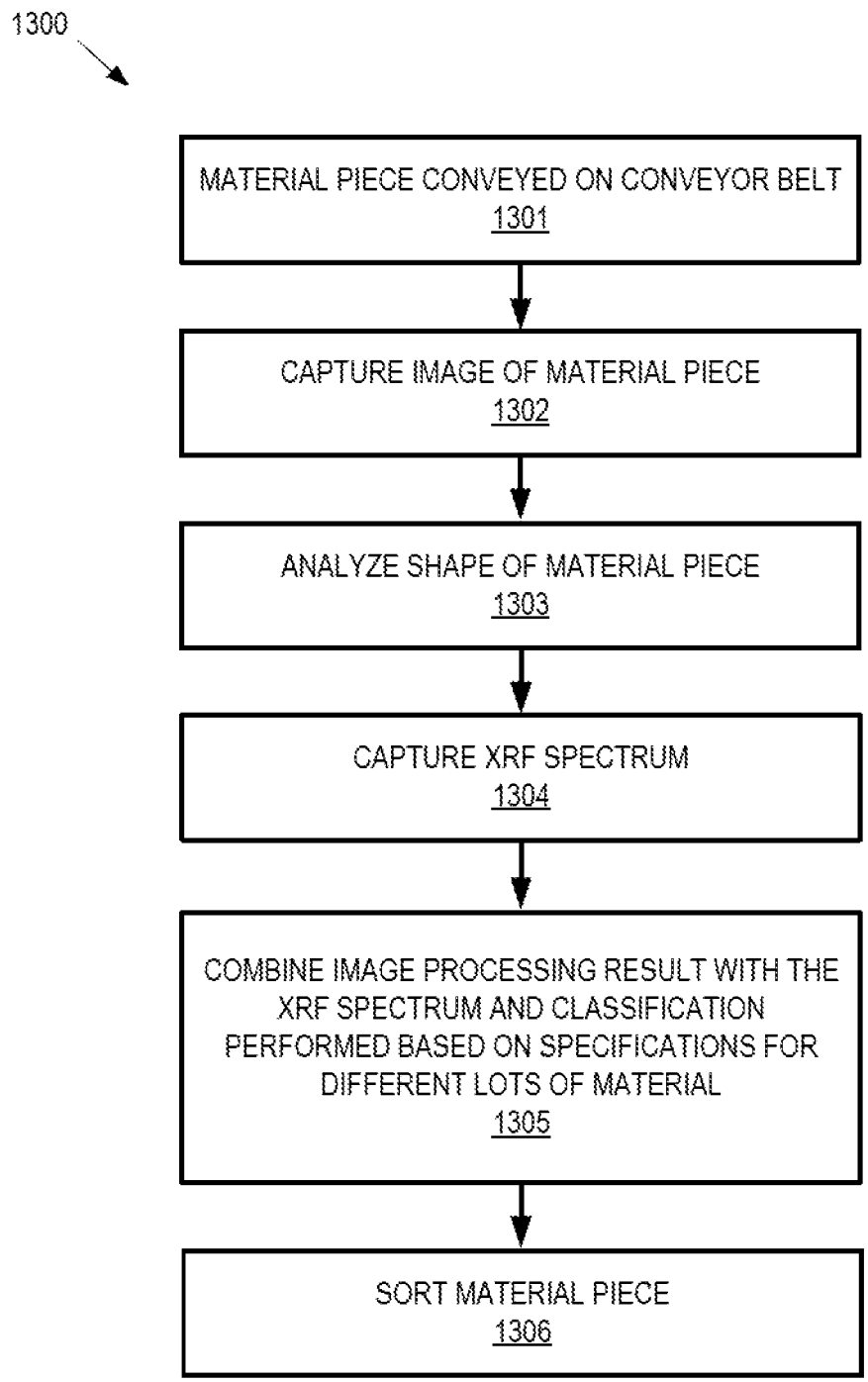
FIG. 13 illustrates a flowchart diagram configured in accordance with embodiments of the present disclosure.

FIG. 13 illustrates a system and process 1300 for utilization when the vision system 110 is implemented in the material handling system 100 before the XRF system 120, such as illustrated in FIG. 1. The material piece 101 is conveyed 1301 on the conveyor belt 103, and an image of the material piece 101 is then captured 1302 by the vision system 110. The shape of the material piece 101 is analyzed 1303 (e.g., using image processing in LabVIEW). Then, the XRF spectrum of the material piece 101 is captured 1304 by the XRF system 120. The image processing result from the vision system 110 is combined with the XRF spectrum, and a classification 1305 of the material piece 101 is performed based on specifications for different lots of material. Thereafter, the material piece 101 may be sorted 1306 accordingly.

When images are captured and processed (e.g., using image processing of the image data packet in LabVIEW), the images that are captured may be resized to a lower pixel specification for faster processing speed (e.g., from approximately 150 milliseconds to 15 milliseconds). Image processing may then further include color threshold compensation, plane extraction, Gaussian blurring, edge detection (Laplacian/Canny-edge), pixel dilation, convex haul, and/or erosion processes. The resulting image may then be passed through a particle filter to calculate the dimensional features such as the area percentage, elongation factor, etc., in order to classify/identify the material piece as being a thin strip or not. The result may then be analyzed with specifications for thin strip and non-thin strip pieces and then compared with the XRF spectrum result for sortation.

In either of the processes described with respect to FIGS. 12 and 13, a neural network model that has been trained with images of thin strip and non-thin strip materials (e.g., captured on a green screen background) can then be configured to recognize the features of different classes of materials so that the results of these can be compared to the XRF result for a more accurate classification/identification decision.

Alternatively, a vision-based material piece classification may be used to obtain the topology of the material piece, and neural networks may then be trained to identify more features that are evident for different classes of metal alloys than simply for thin strips.

As has been described herein, embodiments of the present disclosure may be implemented to perform the various functions described for identifying, tracking, classifying, distinguishing, and/or sorting material pieces. Such functionalities (e.g., various process blocks described with respect to FIGS. 3, 4, 12, and 13) may be implemented within hardware and/or software, such as within one or more data processing systems (e.g., the data processing system 3400 of FIG. 5), such as the previously noted computer system 107, the vision system 110, aspects of the sensor system(s) 120, and/or the automation control system 108. Nevertheless, the functionalities described herein are not to be limited for implementation into any particular hardware/software platform.

As will be appreciated by one skilled in the art, aspects of the present disclosure may be embodied as a system, process, method, and/or program product. Accordingly, various aspects of the present disclosure may take the form of an entirely hardware embodiment, an entirely software embodiment (including firmware, resident software, micro-code, etc.), or embodiments combining software and hardware aspects, which may generally be referred to herein as a "circuit," "circuitry," "module," or "system." Furthermore, aspects of the present disclosure may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a random access memory ("RAM") (e.g., RAM 3420 of FIG. 5), a read-only memory ("ROM") (e.g., ROM 3435 of FIG. 5), an erasable programmable read-only memory ("EPROM" or flash memory), an optical fiber, a portable compact disc read-only memory ("CD-ROM"), an optical storage device, a magnetic storage device (e.g., hard drive 3431 of FIG. 5), or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flowchart and block diagrams in the figures illustrate architecture, functionality, and operation of possible implementations of systems, methods, processes, and program products according to various embodiments of the present disclosure. In this regard, each block in the flowcharts or block diagrams may represent a module, segment, or portion of code, which includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors (e.g., GPU 3401, CPU 3415) may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data (e.g., material classification libraries and neural network parameters described herein) may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to one or more processors and/or controller(s) of a general purpose computer, special purpose computer, or other programmable data processing apparatus (e.g., controller) to produce a machine, such that the instructions, which execute via the processor(s) (e.g., GPU 3401, CPU 3415) of the computer or other programmable data processing apparatus, create circuitry or means for implementing the functions/acts specified in the flowchart and/or block diagram block or blocks.

It will also be noted that each block of the block diagrams and/or flowchart illustrations, and combinations of blocks in the block diagrams and/or flowchart illustrations, can be implemented by special purpose hardware-based systems (e.g., which may include one or more graphics processing units (e.g., GPU 3401)) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

In the description herein, a flow-charted technique may be described in a series of sequential actions. The sequence of the actions, and the element performing the actions, may be freely changed without departing from the scope of the teachings. Actions may be added, deleted, or altered in several ways. Similarly, the actions may be re-ordered or looped. Further, although processes, methods, algorithms, or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), and can also be performed in whole, in part, or any combination thereof.

Reference is made herein to "configuring" a device or a device "configured to" perform some function. It should be understood that this may include selecting predefined logic blocks and logically associating them, such that they provide particular logic functions, which includes monitoring or control functions. It may also include programming computer software-based logic of a control device, wiring discrete hardware components, or a combination of any or all of the foregoing. Such configured devices are physically designed to perform the specified function or functions.

To the extent not described herein, many details regarding specific materials, processing acts, and circuits are conventional, and may be found in textbooks and other sources within the computing, electronics, and software arts.

Computer program code, i.e., instructions, for carrying out operations for aspects of the present disclosure may be written in any combination of one or more programming languages, including an object-oriented programming language such as Java, Smalltalk, Python, C++, or the like, conventional procedural programming languages, such as the "C" programming language or similar programming languages, programming languages such as MATLAB or LabVIEW, or any of the AI software disclosed herein. The program code may execute entirely on the user's computer system, partly on the user's computer system, as a stand-alone software package, partly on the user's computer system (e.g., the computer system utilized for sorting) and partly on a remote computer system (e.g., the computer system utilized to train an AI system), or entirely on the remote computer system or server. In the latter scenario, the remote computer system may be connected to the user's computer system through any type of network, including a local area network ("LAN") or a wide area network ("WAN"), or the connection may be made to an external computer system (for example, through the Internet using an Internet Service Provider). As an example of the foregoing, various aspects of the present disclosure may be configured to execute on one or more of the computer system 107, the automation control system 108, the vision system 110, and aspects of the sensor system(s) 120.

These program instructions may also be stored in a computer readable storage medium that can direct a computer system, other programmable data processing apparatus, controller, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Association of certain data (e.g., between a classified material piece and its known chemical composition) may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations may be not shown or described in detail to avoid obscuring aspects of the disclosure.

As used herein, "manufacturing type" refers to the type of manufacturing process by which the material piece was manufactured, such as a metal part having been formed by a wrought process, having been cast (including, but not limited to, expendable mold casting, permanent mold casting, and powder metallurgy), having been forged, a material removal process, etc.

As referred to herein, a "conveyor system" may be any known piece of mechanical handling equipment that moves materials from one location to another, including, but not limited to, an aero-mechanical conveyor, automotive conveyor, conveyor belt, belt-driven live roller conveyor, bucket conveyor, chain conveyor, chain-driven live roller conveyor, drag conveyor, dust-proof conveyor, electric track vehicle system, flexible conveyor, gravity conveyor, gravity skatewheel conveyor, lineshaft roller conveyor, motorized-drive roller conveyor, overhead I-beam conveyor, overland conveyor, pharmaceutical conveyor, plastic belt conveyor, pneumatic conveyor, screw or auger conveyor, spiral conveyor, tubular gallery conveyor, vertical conveyor, vibrating conveyor, wire mesh conveyor, and conveying material pieces within a fluid past a vision and/or sensor system (including, but not limited to, very small particles suspended in the fluid).

Reference throughout this specification to "an embodiment," "embodiments," or similar language means that a particular feature, structure, or characteristic described in connection with the embodiments is included in at least one embodiment of the present disclosure. Thus, appearances of the phrases "in one embodiment," "in an embodiment," "embodiments," "certain embodiments," "various embodiments," and similar language throughout this specification may, but do not necessarily, all refer to the same embodiment. Furthermore, the described features, structures, aspects, and/or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

Benefits, advantages, and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims. Further, no component described herein is required for the practice of the disclosure unless expressly described as essential or critical.

Herein, the term "or" may be intended to be inclusive, wherein "A or B" includes A or B and also includes both A and B. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The terminology used herein is for the purpose of describing particular embodiments only and is not intended to be limiting of the disclosure. As used herein, the singular forms "a," "an," and "the" may be intended to include the plural forms as well, unless the context clearly indicates otherwise.

The corresponding structures, materials, acts, and equivalents of all means or step plus function elements in the claims below may be intended to include any structure, material, or act for performing the function in combination with other claimed elements as specifically claimed.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Unless defined otherwise, all technical and scientific terms (such as acronyms used for chemical elements within the periodic table) used herein have the same meaning as commonly understood to one of ordinary skill in the art to which the presently disclosed subject matter belongs.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter. As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

The term "coupled," as used herein, is not intended to be limited to a direct coupling or a mechanical coupling. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
capturing information associated with a material piece by a sensor system;
classifying the material piece as a function of the captured information to produce a first classification;
capturing a visual image of the material piece;
analyzing the captured visual image to determine if the material piece has a thin strip shape; and
changing the first classification to a second classification when (i) the first classification is that the material piece is composed of an aluminum alloy with a relatively low copper content and (ii) the material piece is determined to have a thin strip shape,
wherein the second classification is that the material piece is composed of an aluminum alloy with a relatively high copper content.

2. The method as recited in claim 1, wherein the first classification is that the material piece is composed of either a 6xx2 aluminum alloy or a 5xx3 aluminum alloy, and wherein the second classification is that the material piece is composed of a 6xx3 aluminum alloy.

3. The method as recited in claim 2, further comprising sorting the material piece as a function of the second classification.

4. The method as recited in claim 2, wherein the sensor system is an x-ray fluorescence ("XRF") system and the captured information is an XRF spectrum.

5. The method as recited in claim 4, wherein the thin strip shape is defined as having a cross-sectional dimension less than a diameter of an x-ray beam spot produced by an x-ray emitter of the XRF system.

6. The method as recited in claim 4, wherein the thin strip shape is defined as a material piece having an elongated shape with a length of the material piece that is substantially greater than a width of the material piece.

7. The method as recited in claim 1, wherein an aluminum alloy with a relatively high copper content has a copper content greater than 0.2%, wherein an aluminum alloy with a relatively low copper content has a copper content less than 0.2%.

8. A material handling system comprising:
a conveyor system configured to convey a mixture of material pieces;
a sensor configured to capture one or more characteristics of each of the mixture of material pieces;
first circuitry configured to classify certain ones of the mixture of material pieces as belonging in a first class of materials based on the one or more captured characteristics of the mixture of material pieces;
a vision system configured to capture visual images of each of the mixture of material pieces;
second circuitry configured to analyze the captured visual images to determine which of the material pieces have a thin strip shape;
third circuitry configured to change a classification of a material piece as belonging in the first class of materials to a classification that the material piece belongs in a second class of materials when (i) the first class of materials is low copper content aluminum alloys and (ii) the material piece is determined to have a thin strip shape, wherein the second class of materials is high copper content aluminum alloys; and
a sorter configured to sort the material piece from the first mixture of materials as a function of the change of the classification of the material piece.

9. The material handling system as recited in claim 8, wherein the sensor is an XRF system, and wherein the one or more captured characteristics are captured in an XRF spectrum.

10. The material handling system as recited in claim 9, wherein the first class of materials is either a 6xx2 aluminum alloy or a 5xx3 aluminum alloy, and wherein the second class of materials is a 6xx3 aluminum alloy.

11. The material handling system as recited in claim 10, wherein the thin strip shape is defined as having a cross-sectional dimension less than a diameter of an x-ray beam spot produced by an x-ray emitter of the XRF system.

12. The material handling system as recited in claim 10, wherein the thin strip shape is defined as a material piece having an elongated shape with a length of the material piece that is substantially greater than a width of the material piece.

13. The material handling system as recited in claim 10, wherein high copper content aluminum alloys have a copper content greater than 0.2%.

14. A process for sorting material pieces comprising:
conveying a heterogeneous mixture of material pieces past an XRF system and a vision system;
capturing an XRF spectrum associated with a first one of the material pieces by the XRF system;
classifying the first one of the material pieces as a function of the captured XRF spectrum to produce a first classification that the first one of the material pieces is composed of a low copper content aluminum alloy;
capturing a visual image of the first one of the material pieces with the vision system;
analyzing the captured visual image to determine if the first one of the material pieces is a thin strip material piece;
changing the first classification to a second classification when the first one of the material pieces is determined to be a thin strip material piece, wherein the second classification is that the first one of the material pieces is composed of a high copper content aluminum alloy; and
sorting the first one of the material pieces as a function of the second classification.

15. The process as recited in claim 14, wherein the first classification is that the first one of the material pieces is composed of a 6xx2 aluminum alloy, and wherein the second classification is that the first one of the material pieces is composed of a 6xx3 aluminum alloy.

16. The process as recited in claim 14, wherein the first classification is that the first one of the material pieces is composed of a 5xx3 aluminum alloy, and wherein the second classification is that the first one of the material pieces is composed of a 6xx3 aluminum alloy.

17. The process as recited in claim 14, wherein the thin strip material piece has a cross-sectional dimension less than a diameter of an x-ray beam spot produced by an x-ray emitter of the XRF system.

18. The process as recited in claim 17, wherein the thin strip material piece has an elongated shape with a length of the thin strip material piece that is substantially greater than a width of the thin strip material piece.

19. The process as recited in claim 14, wherein the high copper content aluminum alloy has a copper content greater than 0.2%.

* * * * *